United States Patent
Shiva et al.

(10) Patent No.: US 10,984,390 B2
(45) Date of Patent: Apr. 20, 2021

(54) METHOD, APPARATUS, AND COMPUTER PROGRAM PRODUCT FOR SCHEDULING APPOINTMENTS WITH DEAL OFFERS

(71) Applicant: Groupon, Inc., Chicago, IL (US)

(72) Inventors: Arash Shiva, Seattle, WA (US); Simon Vallee, Oakland, CA (US); David Katz, San Francisco, CA (US)

(73) Assignee: GROUPON, INC., Chicago, IL (US)

(*) Notice: Subject to any disclaimer, the term of this patent is extended or adjusted under 35 U.S.C. 154(b) by 0 days.

(21) Appl. No.: 14/935,857

(22) Filed: Nov. 9, 2015

(65) Prior Publication Data

US 2016/0071066 A1    Mar. 10, 2016

Related U.S. Application Data

(63) Continuation of application No. 13/631,313, filed on Sep. 28, 2012, now abandoned.

(51) Int. Cl.
*G06Q 10/10* (2012.01)
*G06Q 30/02* (2012.01)

(52) U.S. Cl.
CPC ..... *G06Q 10/1095* (2013.01); *G06Q 10/1093* (2013.01); *G06Q 30/02* (2013.01); *G06Q 30/0207* (2013.01)

(58) Field of Classification Search
None
See application file for complete search history.

(56) References Cited

U.S. PATENT DOCUMENTS

| | | |
|---|---|---|
| 5,948,040 A | 9/1999 | DeLorme et al. |
| 6,901,374 B1 | 5/2005 | Himes |
| 7,693,736 B1 * | 4/2010 | Chu ............... G06Q 10/1095 705/7.19 |

(Continued)

OTHER PUBLICATIONS

Disclosed Anonymously, System and Method to Identify Optimal Appointment Time, Jul. 27, 2012, IP.com No. IPCOM000220429D (Year: 2012).*

(Continued)

*Primary Examiner* — Jerry O'Connor
*Assistant Examiner* — Matthew H Divelbiss
(74) *Attorney, Agent, or Firm* — Alston & Bird LLP

(57) ABSTRACT

Provided herein are systems, methods and computer readable media for scheduling services and other types of appointments in conjunction with purchasing and/or redeeming deal offers. Merchants may customize a scheduling system to provide scheduling capabilities and deal redemption capabilities to consumers interested in scheduling appointments. A consumer may use the scheduling system to select dates and times, merchant locations, and/or staff members, among other things, when scheduling appointments, and provide deal and/or other payment related information to the merchant. Merchants may use the scheduling system and consumer date received therefrom to track resources across numerous locations, keep apprised of their staffs' availability, receive/generate analytics data related to the affect deals have on their business, and gain a better understanding of their customers. The scheduling system may be integrated into the merchant's website and/or linked to deals offered by a third party promotional system.

19 Claims, 27 Drawing Sheets

(56) References Cited

U.S. PATENT DOCUMENTS

| | | | |
|---|---|---|---|
| 8,364,501 B2 | 1/2013 | Rana et al. | |
| 2004/0039626 A1 | 2/2004 | Voorhees | |
| 2010/0070303 A1* | 3/2010 | Massoumi | G16H 40/20 705/3 |
| 2010/0185465 A1 | 7/2010 | Rana et al. | |
| 2010/0205004 A1 | 8/2010 | Alrdich | |
| 2010/0287103 A1* | 11/2010 | Mason | G06Q 30/02 705/80 |
| 2011/0270643 A1* | 11/2011 | Reichman | G06Q 10/06314 705/7.19 |
| 2011/0313840 A1* | 12/2011 | Mason | H04W 4/02 705/14.35 |
| 2012/0030002 A1* | 2/2012 | Bous | G06O 30/0236 705/14.36 |
| 2012/0150603 A1* | 6/2012 | Bennett | G06Q 30/0611 705/14.23 |
| 2012/0303434 A1* | 11/2012 | Postrel | G06Q 30/02 705/14.23 |
| 2014/0095232 A1* | 4/2014 | Shiva | G06Q 30/02 705/7.12 |

OTHER PUBLICATIONS

M. A. Md Nawi et al., Context-Aware Instant Messenger with Integrated Scheduling Planner, 2012 IEEE, 2012 International Conference on Computer & Information Science (ICCIS) (Year: 2012).*
Next Step for Groupon Scheduler—Groublogpon—The Serious Blog of Groupon [online] [retrieved Mar. 26, 2012]. Retrieved from the Internet: <URL: http://www.groupon.com/blog/cities/next-step-groupon-scheduler/>. (dated Mar. 18, 2012) 5 pages.

* cited by examiner

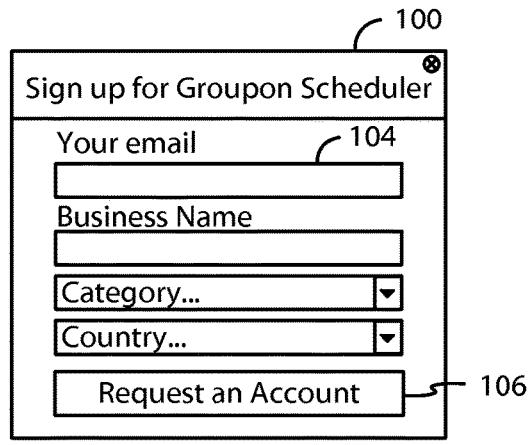
FIG. 1A
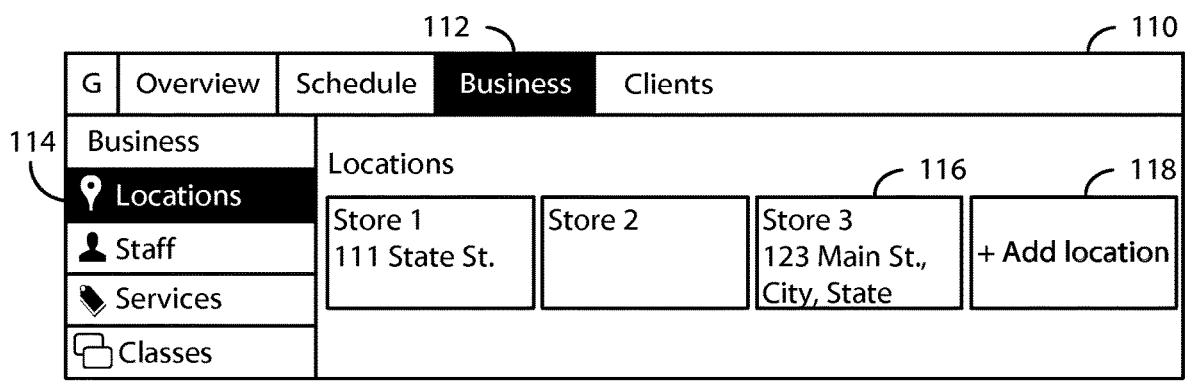
FIG. 1B

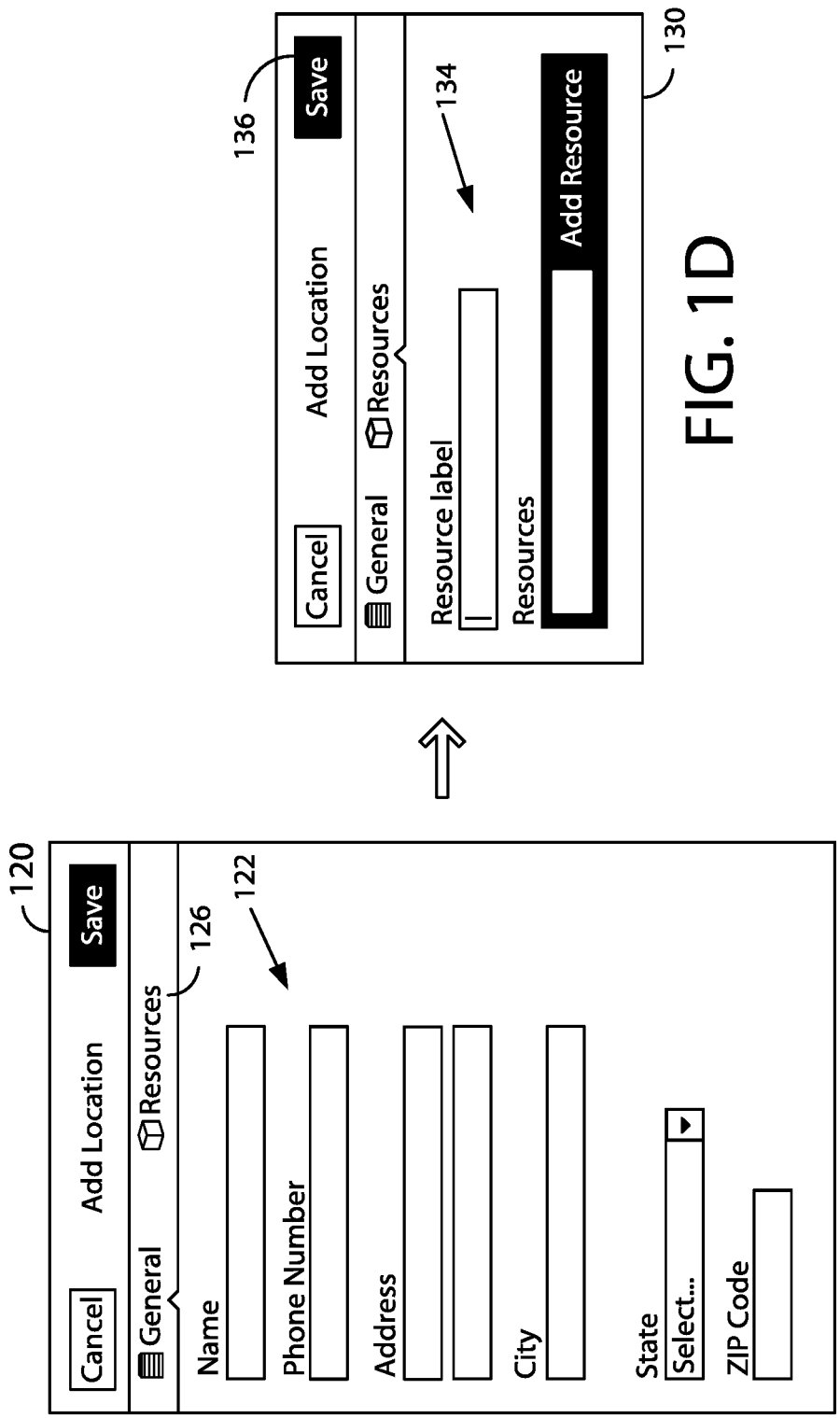

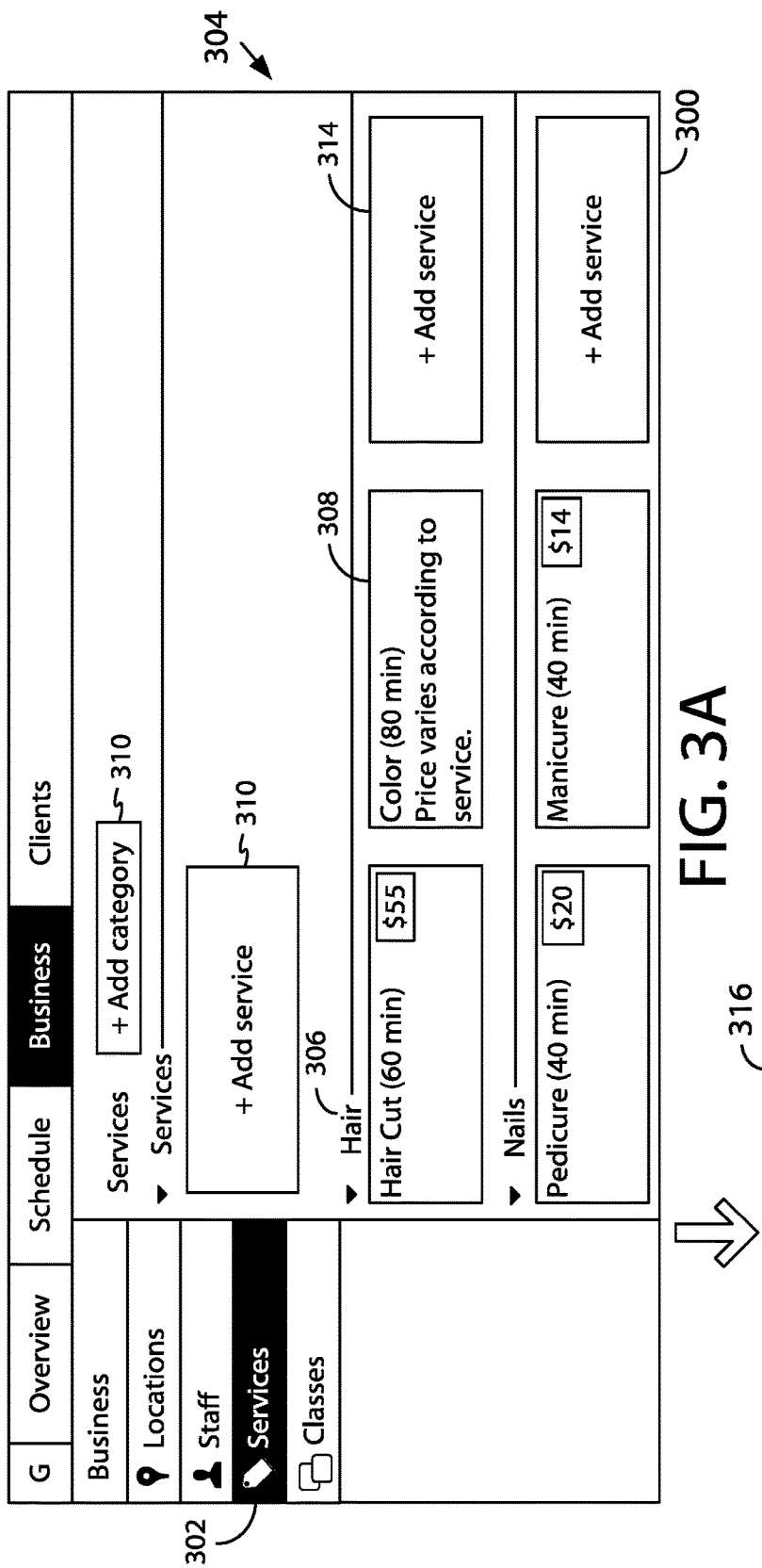

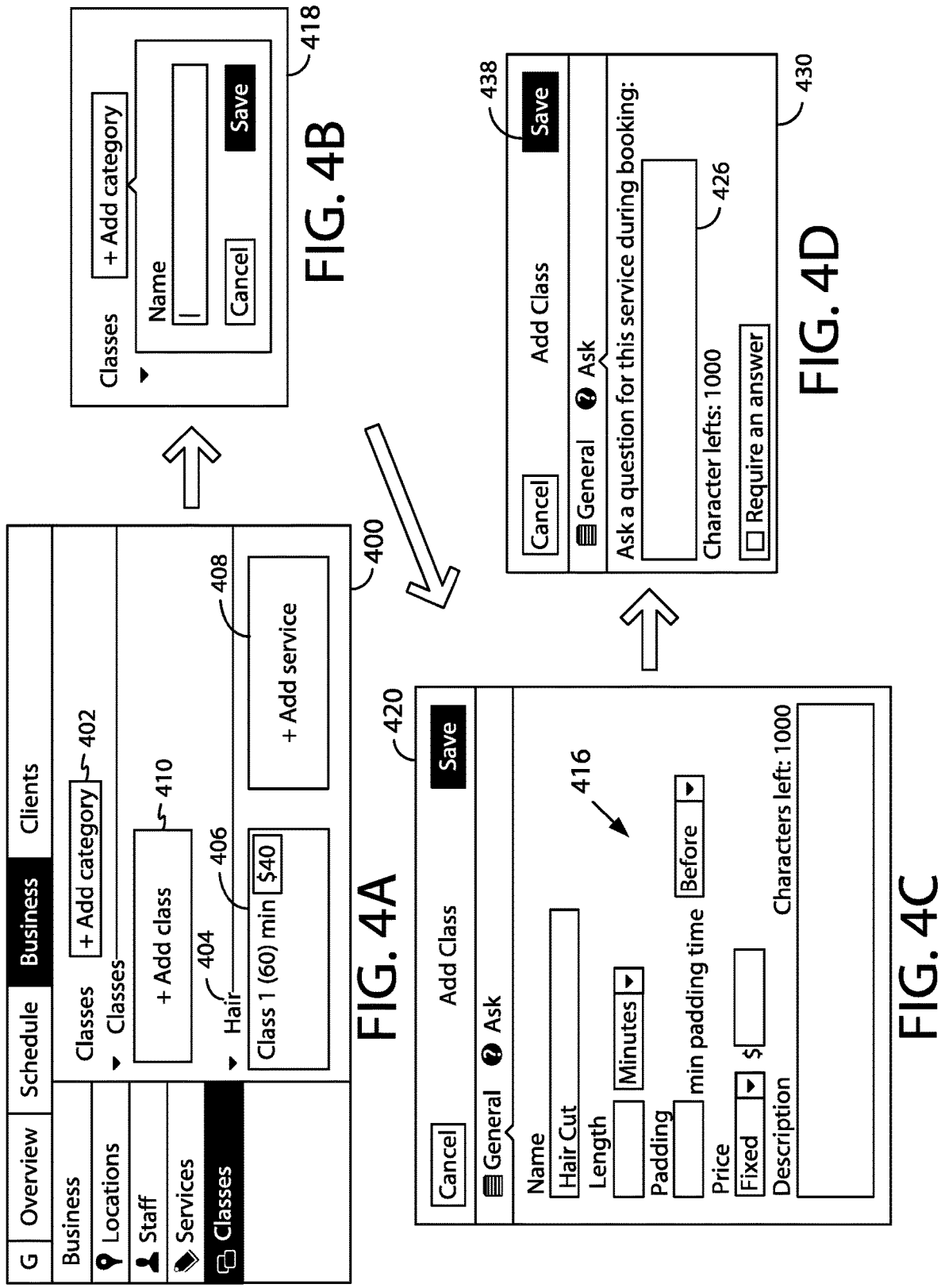

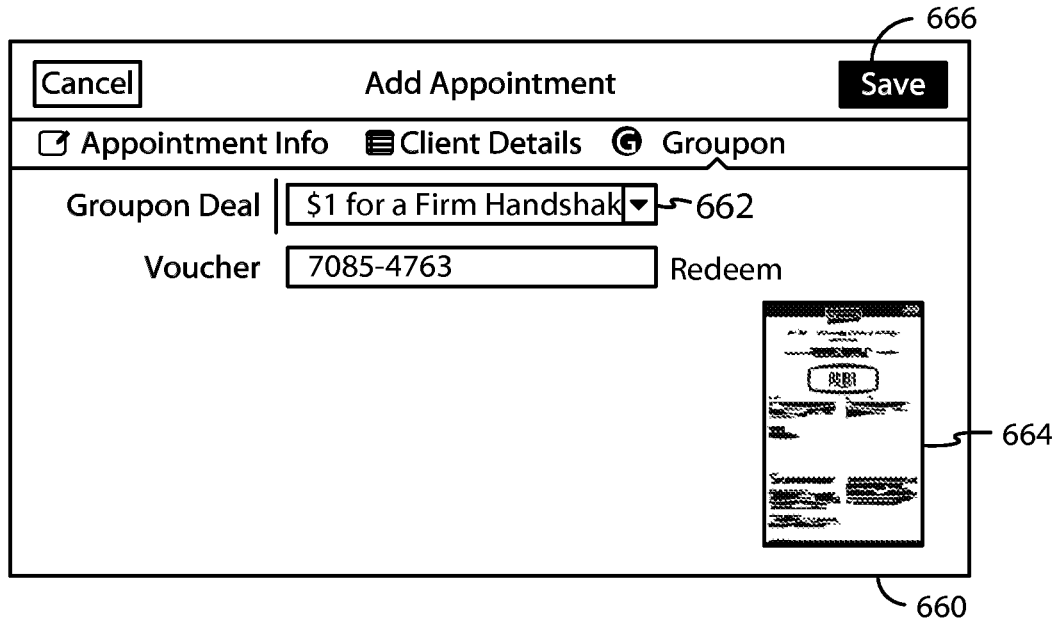
FIG. 6E
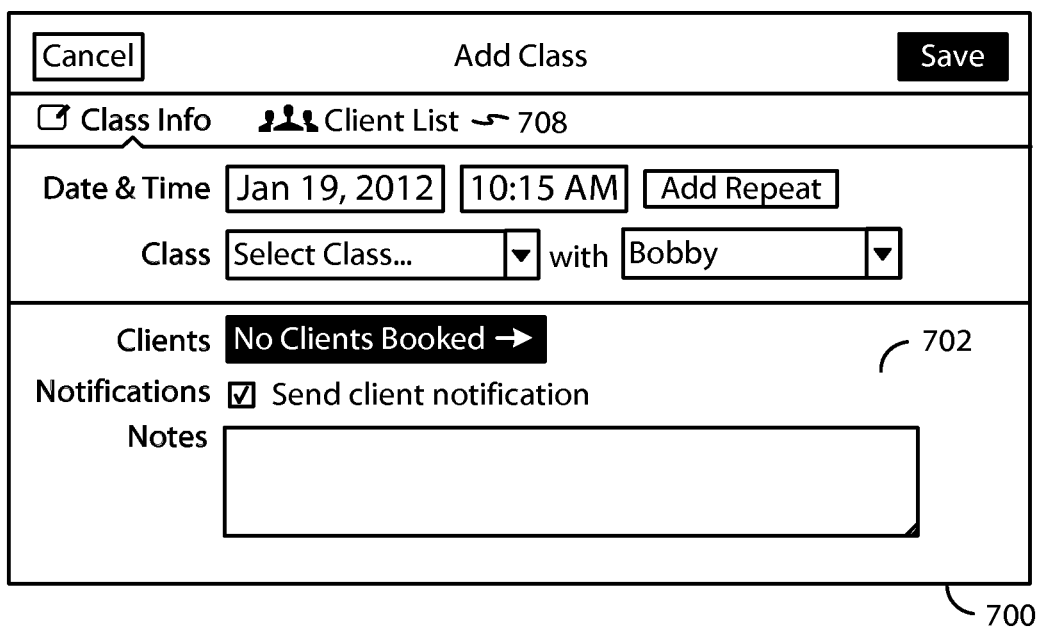
FIG. 7A

FIG. 7B
FIG. 8A

| Cancel | | | Save |
|---|---|---|---|
| ⬛ General | 🔔 Notifications | ✏️ Booking | 🔒 Account ~862 |

Business Name: [          ]

Category: [ Other ▸ ]

Timezone: [ Eastern Time ▸ ]

Email: [          ]

☐ Contact me about important Groupon Scheduler announcements.

| Groupons | ⊙ Redeemable  ○ Upcoming | | |
|---|---|---|---|
| Deep Tissue Massage with Erica Stevenson<br>Wed, Jan 25 – 10:00 AM  👤 Bobby<br>📍 Chicago Ave. Location | No Show | Total bill<br>$100 | Voucher<br>12345678 | ⊘ Redeem |
| Deep Tissue Massage with Madison Bueller<br>Wed, Jan 25 – 9:45 AM  👤 Bobby<br>📍 Chicago Ave. Location | No Show | Total bill<br>$100 | Voucher<br>12345678 | ⊘ Redeem |
| Deep Tissue Massage with Alex Andrson<br>Wed, Jan 25 – 9:15 AM  👤 Bobby<br>📍 Chicago Ave. Location | No Show | Total bill<br>$100 | Voucher<br>12345678 | ⊘ Redeem |

902 — Redeemable/Upcoming toggle
904 — No Show
906 — Total bill
908 — Voucher
910 — Redeem
900 — overall

FIG. 9A

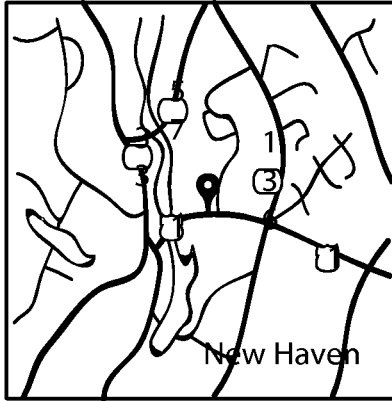

Hair Company Store 1 — 1020

Service Provider: [John Doe ▼] Hair Cut (60 min)   ◁ 🗓 ▷

| | No Preference |
|o|👤 If you don't have a staff preference, this will show all available appointment times.|

| | Bob |
|o|👤 Stylist with 6 years experience.|

| | John Doe |
|o|👤 Manager with 20 years experience.|

Thu, Apr 12
No availability

9:30 AM
10:00 AM
10:30 AM
11:00 AM
11:30 AM
12:00 PM
12:30 PM  12:30 PM
1:00 PM   1:00 PM
1:30 PM   1:30 PM
2:00 PM   2:00 PM

[Previous]                    [Next]
                                 ↳ 1024

Hair Company Store 1 — 1030

Service Provider: [No Preference ▼] Hair Cut (60 min)   ◁ 🗓 ▷ — 1032

| Thu, Apr 12 | Fri, Apr 13 | Sat, Apr 14 | Sun, Apr 15 | Mon, Apr 16 |
|---|---|---|---|---|
| No availability | 9:30 AM<br>10:00 AM<br>10:30 AM<br>11:00 AM<br>11:30 AM<br>12:00 PM<br>12:30 PM<br>1:00 PM<br>1:30 PM<br>2:00 PM | No availability | No availability | 9:30 AM<br>10:00 AM<br>10:30 AM<br>11:00 AM<br>11:30 AM<br>12:00 PM<br>12:30 PM<br>1:00 PM<br>1:30 PM<br>2:00 PM |

[Previous]                    [Next]
                                 ↳ 1034

⬇ FIG. 10D

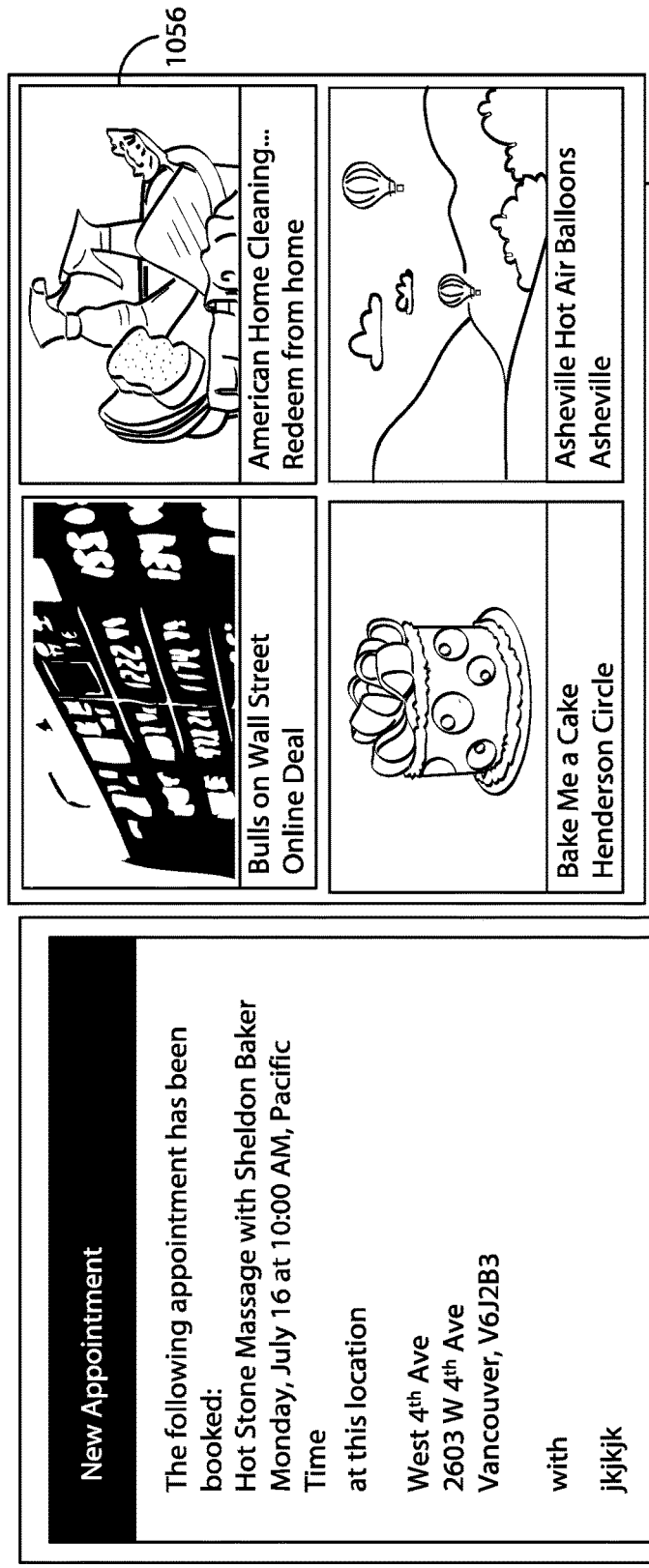

METHOD, APPARATUS, AND COMPUTER PROGRAM PRODUCT FOR SCHEDULING APPOINTMENTS WITH DEAL OFFERS

CROSS REFERENCE TO RELATED APPLICATION

This application is a continuation of and claims priority to U.S. application Ser. No. 13/631,313, filed Sep. 28, 2012, entitled, "Scheduling Appointments with Deal Offers," the entire contents of which are hereby incorporated by reference.

FIELD

Embodiments of the invention relate, generally, to scheduling consumer appointments with a merchant.

BACKGROUND

Merchants selling goods and services to consumers may offer discounts for those goods or services, which are sometimes referred to herein as "products." Merchants may offer discounts with the goal of building a long term relationship with a consumer, increasing sales, promoting different services, or expanding their product line or consumer base. In this regard, areas for improving current discounting systems have been identified. Through applied effort, ingenuity, and innovation, solutions to improve such systems have been realized and are described in connection with embodiments of the present invention.

BRIEF SUMMARY

Systems, methods, and computer readable program code are provided to, in general, improve merchant discounting and promotional systems. More specifically, embodiments provided herein may include a scheduling system, deal system, and/or promotional system that may be implemented individually and/or configured to provide synergies when two or more are implemented together.

A scheduling system may be beneficial to merchants offering services requiring an appointment, such as salons, massage therapists, tour companies, and/or the like, and may be used in conjunction with a deal system and/or promotional system. Similarly, the scheduling system may be beneficial to consumers who make appointments (with other consumers, including friends and family members, and/or with merchants).

A deal system may also or instead be included in some embodiments. For example, merchant services and availability can be maintained by a scheduling system that can be configured to receive requests from consumers to schedule appointments for services for which one or more of the consumers would like to redeem one or more deals that were purchased or otherwise facilitated by a deal system. According to some embodiments, merchants may view past appointments and provide associated deal identifiers in order to indicate that a deal has been redeemed.

Additionally or alternatively, some embodiments may include a promotional system. The promotional system can be used to, for example, analyze scheduling data, generate deal offers based on the analysis, and offer a deal and/or other promotional materials to a consumer. Such a promotional system may also provide functionality for monitoring sales and scheduling data, and generating analytics data to provide to a merchant. Integrating a scheduling system with a deal system may provide a merchant with additional data which, with integration of a promotional system, may allow a business to better target its consumer base with future deal offers. As such, an integrated scheduling system, deal system, and/or marketing system, in addition to one or more consumer devices and merchant devices, may collectively operate as a "promotional system."

For example, a promotional system can include one or more processors on a networked machine that are configured to cause the presentation of one or more deal offers on one or more consumer devices. The promotional system can likewise be configured to receive an indication of a selected deal offer, which was selected from the one or more deal offers by a consumer and is associated with a merchant. The promotional system can then determine whether the selected deal offer is associated with scheduling functionality. In response to determining the selected deal offer is associated with the scheduling functionality, merchant availability information associated with the merchant can be accessed. The promotional system can also be configured to receive a scheduling request comprising scheduling details, schedule an appointment based on the scheduling request, cause the update of the merchant availability information based on the scheduling details, receive a deal identifier associated with the selected deal offer, wherein the deal identifier is associated with a discount for the services to be performed in connection with the appointment, and associate the appointment with the deal identifier to enable the discount to be applied to the appointment.

In some embodiments, the associating of the appointment with the deal identifier can occur after the appointment. For example, after a consumer redeems the appointment, the deal identifier can be associated with the appointment and the consumer may receive the discount for the appointment. In other embodiments, the deal identifier can be associated with the appointment before (e.g., at time of arrival at the merchant, at time of scheduling the appointment, when the deal offer is purchased, etc.) and/or during the appointment.

The merchant availability information comprises at least one of: available days and times; service details; class details; location details; service provider details; and appointment padding times.

In some embodiments, the promotional system can be configured to receive merchant resource information associated with a resource of the merchant, wherein the merchant resource information is associated with the appointment; and in response to the appointment being scheduled, cause the resource information to be unavailable for other appointments. Receiving the merchant resource information can comprise, for example, receiving information related to at least one of: tangible equipment required to perform the appointment; and time required by a service provider to perform the appointment, wherein the time required by the service provider is defined by at least one of: (1) a duration of time and (2) a start time and an end time. As another example, receiving the information related to the time required to perform the appointment comprises receiving at least one of: padding time to be included between the appointment and another appointment to be performed by the same staff member; and processing time that is available during the time required for the appointment, wherein the service provider associated with the appointment can perform other services unrelated to the appointment during the processing time of the appointment.

In some embodiments, associating the appointment with the deal identifier comprises: receiving information associated with the appointment from a scheduling system; receiving the deal identifier associated with the appointment, wherein the deal identifier is retrieved from a networked database maintained by a third party based on the information associated with the appointment; receiving a request to redeem a deal associated with the deal identifier; and setting a status of the deal to redeemed.

In response to receiving the merchant availability information, the promotional system can be configured to analyze scheduling data; generate a new deal offer based on at least the analysis of the scheduling data associated with the deal identifier; and provide the deal offer to a consumer. In this regard, scheduling data, such as when a merchant has unused service and/or other type of inventory, can be promoted for a discount prior to the inventory expiring. For example, in the hours or days leading up to the available time slot, the available time slot can be realized and a deal offer for the available time slot can be made available. The new deal offer can be generated is in response to receiving an indication of a merchant approving the proposed deal offer that is generated based on the analytics data. The new deal offer can be generated in response to receiving an indication of the merchant authorizing a promotional system to execute a promotional campaign using deal offers.

In some embodiments, the promotional system can be further configured to identify patterns in availability over a period of time; determining when consumers are less likely to schedule an appointment; and generating a proposal for the new deal offer based on when consumers are less likely to schedule an appointment.

Some embodiments can include identifying patterns in availability over a period of time as a result of analyzing the scheduling data; determining when consumers are more likely to schedule an appointment from the patterns; and generating a proposal for a high-demand deal offer based on when consumers are more likely to schedule an appointment that is discounted less than the selected deal offer and/or generating a proposal for a low-demand deal offer based on when consumers are more likely to schedule an appointment that is discounted more than the selected deal offer.

Some embodiments may also or instead provide a method for tracking analytics data, comprising: monitoring sales data; monitoring scheduling data; generating, by a processor of a networked machine, analytics data based on at least one of the sales data and the scheduling data; and causing display of information conveying the analytics data to a merchant. The analytics data can comprise at least one of: an indication of a number of appointments booked using a deal offer; an indication of a percentage of appointments booked using a deal offer compared to a number of total appointments booked; and an indication that a deal offer has caused an increase in scheduling of appointments. Additionally, non-transitory computer readable media can be configured to provide some or all of the functionality discussed herein and/or other means for providing the functionality discussed herein is included in accordance with some embodiments.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

FIGS. 1A-9A show example graphical user interface displays that may be presented by various components of systems in accordance with some embodiments discussed herein;

FIGS. 10A-10G show example graphical user interface displays that may be presented by various components of systems in accordance with some embodiments discussed herein;

FIGS. 10I-10J show example graphical user interface displays that may be presented by various components of systems in accordance with some embodiments discussed herein;

DETAILED DESCRIPTION

Figures 6A, 6B:
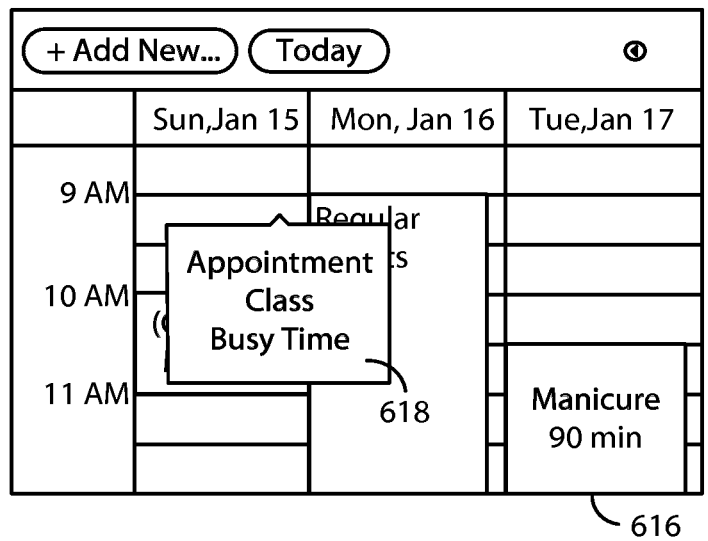

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

FIGS. 1A-9A show example displays that may be presented by one or more display screens of one or more machines, sometimes referred to herein as "merchant devices," in accordance with some embodiments discussed herein. For example, the displays of FIGS. 1A-9A may be presented to a merchant by a personal computer and/or mobile, handheld merchant device. It will be appreciated that any number of staff members employed by a merchant may have access to systems such as a promotional system, and, as such, the term "merchant" will be used herein to describe any user representing the merchant. The displays of FIG. 1A-8 are examples of graphical user interfaces that may be provided to aid in configuring, and maintaining a scheduling system that may be integrated with a deal and/or promotional system. The display of FIG. 9A may provide a deal redemption interface for a merchant utilizing an integrated scheduling-deal system, and optionally, a promotional system. The display of FIG. 10 may provide for scheduling of an appointment by a merchant, consumer, or the like, by use of one or more machines. Similar to a merchant device, as described above, a machine used by a consumer may be referred to herein as a "consumer device" and may be a personal computer (e.g., desktop computer) and/or mobile device (e.g., tablet computer, laptop computer, cellular telephone, etc.). Examples of merchant devices and consumer devices are discussed in connection with FIGS. 12 and 13.

The display of FIG. 1A, namely display 100, is an example graphical user interface that may be displayed by a merchant device to a merchant and help enable the merchant to register to use an online scheduling system provided by a third party, such as a promotional system. Display 100 may be accessed in response to, for example, selecting a link on a webpage and/or in an email, and/or by any other suitable way to indicate a desire to create an account with a scheduling system. In some embodiments, merchants may be presented with a link to navigate to a display, such as display 100, while accessing a deal system or responding to promotional material provided by the promotional system. As such, a deal identifier may be stored in session upon accessing display 100. Display 100 may include user input fields 104, in which a merchant may enter business information, such as, for example, an email address, business name, business category, and country of operation. Display 100 may include any additional content or user inputs, as well as an option 106 for a merchant to register to use a scheduling system.

Merchant access to a scheduling system may be authorized automatically, or may require approval by an administrator, or the like, of the scheduling system. Additionally or alternatively, a merchant may be asked to confirm an email address by receiving a confirmation email and following the instructions, such as selecting a link in the email, in order to activate an account. Merchants with an active account may access a display 110 of FIG. 1B to provide locations of their businesses. For example, a merchant may indicate a desire to configure and/or maintain business details at 112 and/or indicate a desire to setup or maintain business locations at 114. In this example, locations recognized by the scheduling system as being associated with the merchant may be provided on display 100, such as the store displayed in display area 116. Such locations may be preloaded into the scheduling system from another system, such as, for example, a deal system, another sister system included in the promotional system, a third party system (such as a publically available phone and/or address database), and/or any other source of information. For example, the merchant may have previously offered a deal to consumers using a deal system and may now want to register to use the scheduling system. Upon entering the information into display 100, any location that previously offered deals using the deal system may be pre-populated for the merchant in display 110.

Additionally or alternatively, locations provided to the scheduling system during a prior configuration session may be retrieved and displayed. The display of business locations may include any details regarding the location, such as, but not limited to a name, phone number, address, and/or any other location information. The business location information may be grouped together and displayed, such as in display area 116, and may be selectable as a single entity and function as a link to another display that, for example, allows modification of the location details. Additionally or alternatively, an indicator such as option 118 may be provided to allow for entry of information related to another business location.

Display 120 of FIG. 1C is an example display used for adding a location to a merchant account registered with a scheduling system that may be provided in response to determining that option 118 has been selected. It will be appreciated that a same or similar display may be used to edit an existing location. Display 120 may appear as a layer over display 110, so that a user may view both displays, and/or display 110 may transition into display 120 such that only display 120 may be visible. It will be appreciated that the same design and/or implementation options may be considered in regard to the displays discussed herein, including FIGS. 1A-9A and 10A-10F. Returning to display 120, merchants may use input fields 122 to provide location details, including, for example, location name, phone number, and/or address. In an instance where display 120 is used to modify an existing location, some or all of user input fields 122 may be prefilled with the existing information as retrieved from a scheduling system when display 120 is initially presented to the merchant user.

Display 120 may also provide an option 126 for a user to initiate transition of display 120 to display 130, shown in FIG. 1D, to provide resource information related to the merchant location information being added or edited. In this regard, display 130 may comprise user input fields 134 configured to accept resource information. Resource information may include data regarding any physical asset and/or other tangible equipment used to provide a service. For example, a massage therapist may use display 130 to add resource information for tracking massage tables and/or rooms, which may then be used as resources in scheduling appointments. As another example, a bicycle tour company may use display 130 to enter resource information for each of its bicycles and track the use of the bicycles as resources. In this regard, the scheduling system can be configured to track inventory of merchants' resources to make sure sufficient resources are available for an appointment (e.g., aid in assuring there are enough bikes available at 3:00 pm for a party of four people). As such, a merchant user may utilize embodiments herein to create, upload and subsequently access resource information related to the location, use, and/or availability of equipment and/or other resources, to prevent overbooking and/or misallocation of resources. Additionally or alternatively, a service provider may be considered as a resource. As such, resource information may include time required by a service provider to perform the appointment. The time required by the service provider may be defined by, for example, a duration of time, a start time and an end time, and/or by any other suitable means.

Display 130 may also provide an indicator, such as save button 136, for saving resource information associated with a merchant's location. Saved resource information may be stored on the scheduling system and display 110 of FIG. 1B may be updated to display the saved locations, including newly added locations as well as updates to existing locations.

Continuing now to FIG. 2A, display 200 may be a variation of display 110, where area 204 changes in response to an indication at 202 to display staff information. Accordingly, area 204 may provide information for existing staff members, such as staff member information 206. Staff information may include the name of the staff member and any other information provided. Staff information, like any other information discussed herein, may be loaded (e.g., auto-imported) into the scheduling system from another source such as a deal system and/or merchant system, and/or provided by a merchant using a merchant device configured to present the displays of FIGS. 2A-2C. For example, a merchant may indicate by selecting option 208 a desire to add a staff member, and may be subsequently provided with a display, such as display 210 shown in FIG. 2B, to provide the staff member details. Additionally or alternatively, an existing staff member, such as that represented by staff member information 206, may be selected by the merchant and the selection may be interpreted by the merchant device as an indication to edit the associated staff member information.

Display 210 of FIG. 2B may be used to provided staff member details, such as, for example, a name, picture, and/or description associated with the staff member. Staff member information may be provided via user input fields included in area 214, where a picture input field may include an interface for indicating a local file name and location for uploading, such as, for example, an interface allowing local file browsing and selection for uploading. It will be appreciated that in an instance where a user is modifying details for a staff member already in the scheduling system, user input fields 214 may be prefilled. A user may indicate, by selecting option 212, a desire to transition display 210 to another display, such as display 220 of FIG. 2C, with which staff member available hours by location may be displayed and/or otherwise configured. A user may select a location, such as location option 222. In instances where only one business location is stored on the scheduling system, an individual location option may not be displayed, and a user may assume the staff member hours will be associated with the existing location. In area 224, the scheduling system may provide inputs for a user to indicate days and times a staff member is available to provide consumers services and/or otherwise works at a selected store and/or other type of location associated with the merchant. The example display 220 may be configured to provide a recurring weekly scheduled for a staff member, however, it will be appreciated that any configuration for scheduling hours may be provided, such as monthly scheduling or custom scheduling. The scheduling system may also provide an input for a user to indicate at which intervals an appointment with the staff member may begin, such as user input field 226. A user may indicate saving staff information by way of an indicator, such as save option 228. Saved staff information may be stored in the scheduling system and updated when presented in display 200.

Display 300 of FIG. 3A may be another variation of display 100 and/or 200, where area 304 has been transitioned to present service information in response to, for example, options 302 being selected. Service information, such as that displayed at service option 308, may be loaded into the scheduling system from another source such as a deal system, merchant system, and/or the like, and/or it may be provided by use of displays such as those in FIG. 3A-3E. The service information may include a name, average length of appointment for the service, cost, comments regarding the service and/or any other information associated with a service.

In some embodiments, area 304 may display services by category, such as category 306. In this example, service option 308 is assigned to category 306. A user may add a category by selecting option 310, which may trigger the transition to display 316 of FIG. 3B. On display 316, a user may indicate the name of a new category to add, causing display 300 to update and display the newly added category. A user may also select an indicator, such as option 312 and/or option 314, where option 314 provides for adding a service to category 306 and option 312 provides for adding a service not assigned to particular category. In some embodiments, a merchant may drag and drop a service from one category to another, in order to change the assigned category while otherwise preserving the configuration of the service. Similarly, services may be reordered within a category, such as for example, to move a more commonly used service to a first position in the category.

A display, such as display 320 of FIG. 3C, may be shown in response to receiving an indication to add a new service by determining there was a selection of option 314 and/or to edit an existing service based on detecting a selection of service option 308. User input fields 322 may be prefilled in an instance where a service is being edited. Such user input fields may include, but are not limited to the name of the service, an average length, in minutes, hours or the like, a padding time that may be blocked prior to and/or following an appointment, and/or a price that may be fixed, variable, or not pre-set, among other things.

In some embodiments, a merchant may also provide a processing time for particular services or service combinations. For example, salon services associated with service option 308 may require the attention of a staff member for 20 minutes to apply a hair color, but the staff member may subsequently have 30 minutes to work on other services and/or administrative work while the color sets, before having to return to the consumer for 40 minutes to rinse out and style. In other words, the staff member may have 30 minutes processing time 20 minutes into an 80 minute appointment, and that processing time can be tracked to allow for optimal and/or maximized scheduling of services, staff members, and/or resources.

Padding time may differentiated from processing time in that padding time, as referred to herein, is more akin to downtime (e.g., non-service time) needed or otherwise desired between adjacent appointments provided by the same staff member to allow the staff member to, for example, clean the service area (e.g., turn-over a table, sterilize massage equipment, refill go-cart gas tanks, etc.). Processing time, as referred to herein, is downtime (or other non-service time) during an appointment that can be constructively managed and scheduled to enable assets to be more fully utilized throughout the day (e.g., Segways used to provide tours of a city may be rented for a relatively short period of time if the tour group is scheduled to stop for lunch and/or visit a museum off the Segways for a few hours).

The service information inputs may also include a description that may be used to describe what a consumer could expect from such an appointment, or any other information a merchant would like to associate with a service. A user may additionally indicate via option 326 to assign staff members to a service. As such, on display 330 of FIG. 3D, staff members stored in the scheduling system with respect to the staff details, which may have been received by the system via FIGS. 2A-2C, may be displayed in area 336 to assist the merchant in indicating which staff member(s) may provide the service. Additionally or alternatively, a user may indicate by selection option 338 to transition to display 340 of FIG. 3E to configure the scheduling system to prompt a client with a question when scheduling an appointment for a particular service. In area 342, the merchant may provide a question to be asked and/or other information to be presented to a consumer during scheduling of an appointment, and may optionally indicate that an answer is required by a consumer when scheduling the appointment. A merchant may indicate, such as via a save button 348, to save the provided service details to the scheduling system. In response, display area 304 may update to reflect any additions or changes in services.

Continuing to FIG. 4A, where display 400 may be another variation of display 100, and where a merchant user has selected to configure a class type. Similar to the configuration of services, classes, such as that represented by class information box 406, may be grouped by category, such as category 404, and/or may be created independently and/or not assigned to a category. In some embodiments, a class may be handled by the system as a type of container associated with multiple participants and/or service appointments. A class scheduling may be configured to require a minimums and/or maximum number of participants, and may be configured to allow or restrict deal redemption in conjunction with scheduling a class. For example, only a certain percent of class participants may be allowed to redeem a deal to book a class.

Option 402 may provide an option to add a class category, which may be added via a display, such as display 418 of FIG. 4B. Returning to display 400, a merchant may add a class type by selecting an option, such as option 408, within category 404, or option 410. A user may also modify existing class information by selecting a class such as class information box 406. Class schedules may also and/or instead be defined when starting from the schedule tab (discussed in connection with, e.g., FIG. 6), after which they can be made available for scheduling in accordance with the parameters provided via display 420. For example, the number of participants or "appointments" within the class may be limited by the class size indicated in area 416 even if the class is defined and/or display 420 presented via the schedule tab.

Example display 420 of FIG. 4C provides user input fields in area 416 to provide details of a class type. Such details may include a class name, length, padding before and/or after the class, price, maximum class size, and a description. As shown in display 430 of FIG. 4D, a merchant may additionally enter into data field 426 a question to be asked and/or provide other information to be displayed to a consumer when the consumer is scheduling to take a class. An option, such as save button 438, may be used to initiate the saving of the class details to the scheduling system. In response, display 400 may update to reflect the changes and/or additions in class types.

Continuing to display 500 of FIG. 5, in some embodiments a merchant may indicate a desire to manage a client list, such as by selecting option 502. A "client," as referred to herein, can include a consumer who has purchased product and/or is scheduled to purchase product from the merchant. Display 500 may include a list of current clients in display area 516. The clients included in display area 516 may be loaded to the scheduling system from another source, such as a deal system. For example, clients who have purchased a deal from the merchant in the past may be automatically loaded into the scheduling system. Clients may also be imported from other systems, such as another third party system(s) and/or other system(s) maintained by the merchant. Additionally or alternatively, the scheduling system may store client information associated with clients who are scheduling appointments using the scheduling system, but whose information is not already stored in the scheduling system. In some embodiments, users may activate a search interface by selecting an option, such as option 512. Users may search for a client by using a search input, such as text provided to input area 514, that may result in the filtering of client list in display area 516 to only display clients matching the search criteria. A search may be run against any client identifier (e.g., client name), and the search may be initiated upon entry of each character, or upon receiving indication from a user. As another example, a search based on metadata associated with the client can be performed. For example, metadata may be associated with the client indicating the client has redeemed a deal offer, such as those provided by Groupon, Inc., and by typing "Groupon" into input area 514 the merchant can view clients that have redeemed a Groupon deal offer with the merchant in the past.

Selection of a client listing included in display area 516 may result in loading in area 522 client information associated with the client. An option, such as option 518, may be selected and cause the displaying of the same fields of area 522. In an instance in which a user is providing new client information, the inputs may initially be empty and may provide a means for a user to add a new client to the scheduling system. The client information to be modified and/or added may include, but is not limited to, a client name, email address, phone number, notes about the client, and/or the client's address. Client information may be saved in response to save button 524 being selected and, for example, the scheduling system may store the new and/or updated client information. The next time the client list is displayed (e.g., in display 500), it may reflect any changes in display area 516. Additionally or alternatively, a merchant may delete a client from the client list shown in display area 516 by selecting an option, such as delete button 520.

In some embodiments, in response to selection of an existing client, scheduling information associated with the client may be displayed. For example, area 532 of display 500 includes a selection to display past appointments or appointments scheduled for the future. Appointment details matching the filtering criteria may be displayed in area 536. The displayed appointment details may include, but are not limited to, an appointment type, date, time, length, staff member providing the service, and the location at which the appointment was held. Additionally or alternatively, some information may be displayed as a link, such as the appointment type 538. Such a link may provide additional details with respect to the appointment.

Continuing to FIG. 6, display 600 may be another variation of display 100, modified in response to indication at 602 that a user wants to manage the merchant's schedule. As such, display 600 may include a configurable calendar view of the merchant's schedule. When applicable, the calendar may be manipulated by location filters and/or staff filters 604, among other things. The filters may be used in any combination, including individually, to manipulate how the information associated with the merchant's schedule is displayed. For example, a user may select a location, a staff member, or both. Given the user's selection, the calendar may display appointments, such as appointment 608, with all staff members for the selected location, all locations for a single staff member, or all appointments for all locations and all staff members. Additionally or alternatively, a user may change the view of the calendar to a day or month view using option 606. A user may navigate to future time periods by selecting an option included in display 600, such as option 610.

In some embodiments, a user may initiate adding an item to the calendar of display 600 by selecting option 612. In response to selecting option 612, the scheduling system may cause an overlay to be presented, such as overlay 618 of display 616 shown in FIG. 6A. According to this example, a user may select to add an appointment, add busy time, and/or add a class, which will be described in more detail with regard to FIGS. 6B-6E and 7A-7B, respectively.

FIG. 6B shows an example display, namely display 630, that may be presented following selection of an option included in overlay 618 to a add busy time to a schedule. "Busy time," as referred to herein, includes time that may be unavailable for booking by a consumer in a merchant's schedule. Busy time may be scheduled, for example, to enable merchants to have a break (for personal, professional, legal and/or other reason), early closings, holidays, and/or for any other reason to prevent a consumer from scheduling an appointment during a specific time frame, which may be related to or agnostic to one or more particular staff members and/or one particular merchant locations. Display 630 is shown as including area 632 for the merchant to provide busy time details. In this example, a merchant may enter a date and time, optional repeat details, a staff member, description, notes, and an indicator of whether or not to prevent online bookings by a consumer during the blocked period. It will be appreciated that area 632 may include any combination of the example data fields and/or any additional information regarding the busy time. In response to receiving an indication from a user to save any changes, such as determining there has been a selection of save button 634, the busy time may optionally be validated, such as, for example, against the existing schedule. More particularly, in an instance where an appointment is already scheduled, an alert may be presented to a merchant that it may need to reschedule a consumer's appointment. The busy time may be saved to the scheduling system and any subsequent requests to view a schedule may result in a display including the busy time. Busy time may display in such a way that it is visually distinguished from appointments, such as, for example, displaying in a different color, font, etc. Additionally or alternatively, different information may display on a schedule for busy time relative to that of appointments.

In some embodiments, in addition to or instead of blocking time out as busy time, at least some of the merchant's time (e.g., one or more blocks of time) on the merchant's schedule can be identified as "deal-less" time. As referred to herein, deal-less time is when the merchant will not accept an otherwise valid (or other type of) deal offer for services performed during those times. For example, the merchant may indicate that a valid deal offer may not be redeemable at times during which the city provides free parking and use embodiments discussed herein to convey to the consumer when are those times. The merchant may utilize embodiments discussed herein to manage and/or notify the consumer in advance the times during which the merchant will not accept a deal offer for services performed (e.g., even if the merchant has availability to make an appointment at that time). In some embodiments, the merchant's configuring one or more deal-less times will override any automated functionality with regards to generating potential deal offers (such as based on analytics data discussed below). In other embodiments, the system's ability to make suggestions as to potential deal offers will ignore and/or take only take into consideration (as opposed to being completely overridden) the deal-less time(s). Additionally or alternatively, like other examples discussed herein in relation to time management, similar functionality (e.g., deal-less functionality) can be associated with the merchant's non-time based inventory. For example, certain tangible assets may have deal-less associations that can be managed by embodiments discussed herein. Additionally, deal-less times and/or restrictions can be dynamically configured based on one or more parameters entered by the merchant and/or third party user (e.g., times that have fee parking, relative availability of the merchant, holidays, short work weeks, etc.). For example, deal-less time may be eliminated during a non-tourist season or when it is raining outside (as reported by an online weather service for the merchant's zip code). Additionally or alternatively, some embodiments may restrict a consumer from redeeming a purchased deal offer for the service and/or appointment being scheduled during timeframes based on the deal, such as a time-restricted deal for high-demand or low-demand timeframes (additional examples of which are discussed below).

Figures 6C, 6D:

FIG. 6C shows an example display, display 640, that may be used by a user to add an appointment to the merchant schedule. Such a display may be used, for example, by a the merchant during a phone call with a consumer wanting to schedule an appointment, or while a consumer is onsite at the merchant location and wishes to schedule a future appointment. In example display 640, area 642 may provide user input fields for the merchant to enter appointment scheduling information. Appointment scheduling information may include a day and time of appointment, repeat appointment details, type of service, staff member, deal type and identifier to be used in paying for the service, price to be charged, and/or client information. The appointment details may include any number of these items, and/or additional items a merchant may want to enter. Additionally, some appoint scheduling information may prefill, such as client information, as it is typed, and/or as a name is selected from an existing list of clients. An optional indicator for sending a client an email confirmation may also be provided. In this example, an additional display, such as display 650 of FIG. 6D, can provide additional and/or alternative consumer information input fields, such as address fields, that may be included in area 652.

A display such as display 660 of FIG. 6E may provide the ability for a merchant user, such as a staff member, to provide information regarding a deal offer the consumer would like to redeem in conjunction with scheduling the appointment. For example, an additional promotional system option may be provided that enables deal offer information to be entered in area 662. Display 660 may also include a description of the deal offer being redeemed, which may be freely entered, and/or selected from a drop down of available deal offers and/or a voucher numbers associated with deal offers. Area 664 may be used to display details associated with the deal information (e.g., including a preview of a printable and/or machine readable form that may be presented by the consumer to redeem the deal offer) in area 662.

In response to receiving an indication, such as a selection of a save button 666, the appointment may be saved to the scheduling system and any displays of the schedule updated accordingly. Additionally or alternatively, client information provided during the appointment scheduling may be synchronized with the client list on the scheduling system. As such, any newly added clients may be added to the list, and/or updates to existing clients while scheduling an appointment may be reflected in the client list. Confirmation emails may be generated according to display indicators, merchant settings, and/or system other system default settings, among other things. In some embodiments, a consumer may receive an email confirming a booking Additionally or alternatively, a staff member may receive a confirmation and/or subsequent reminder of an appointment when an appointment requiring the staff member's services is scheduled.

Continuing to FIG. 7A, display 700 is an example display that may be presented following selection of an option included in overlay 618 to schedule a class. Area 702 of display 700 can include one or more user input fields configured to receive various types of data, such as, for example, day and time, repeat options, class type selection, staff member teaching the class, notes, and indicators related to whether or not a client should receive a notification email following registration, among other things.

A merchant may indicate, by selecting option 708, a desire to transition to a different display, such as display 710 of FIG. 7B, used to maintain the list of clients scheduled to participate. In display 710, a merchant user may enter client information in area 712, and/or the user may select a client from a client list. Additionally or alternatively, a user may indicate a deal type and/or provide a deal identifier, price, notes, and/or other information pertaining to the class in which the client would like to sign-up to participate in. In response to receiving an indication of saving a scheduled class, such as determining save button 714 has been selected, the scheduling system may store the class details, including client list. The class may appear on a display of a schedule, and the scheduling system may generate emails to associated clients and/or staff members.

Continuing to FIGS. 8A-8D, a merchant may access displays 800, 810, 820, and 830, respectively, during an initial account setup and/or from any other display by indicating the merchant wishes to edit its account settings. The account settings may include any details pertaining to the merchant's business, including, for example, scheduling of appointments, notifying staff and clients, general business times of operation, and/or any other merchant related information. For example, by selecting option 802 of display 800, a merchant user may configure settings to indicate how consumers will be able to schedule appointments, including, for example, whether or not new appointments will be automatically or manually accepted, whether to prevent customers from choosing a service provider, the amount of time (e.g., in hours) before an appointment during which cancellations can be made, the amount of time before an available time slot during which an appointment can be made, and/or how far in advance appointment time slots may be made available to prospective consumers and/or past clients.

As another example, option 812 can be selected and, in response, display 810 can be presented. Display 810 can be configured to provide user input fields to configure email notifications to staff and clients, among other things. For example, a reminder can also be configured and, in some embodiments, the amount of time before the appointment the reminder should be sent to clients and/or a service provider(s). A service provider may include a staff member, owner, contractor or any other person or thing that provides a service and is associated with the merchant.

In response to option 822 being selected, display 820 can be configured to provide area 824 having code (e.g., in the HTML language) that is generated by, for example, the scheduling system to enable the merchant to copy the code onto another website for clients to select to access the scheduling system to schedule an appointment. In response to selecting option 826, a preview can be provided to the merchant to see how the booking instructions will look to the consumer when run.

Figure 8D:
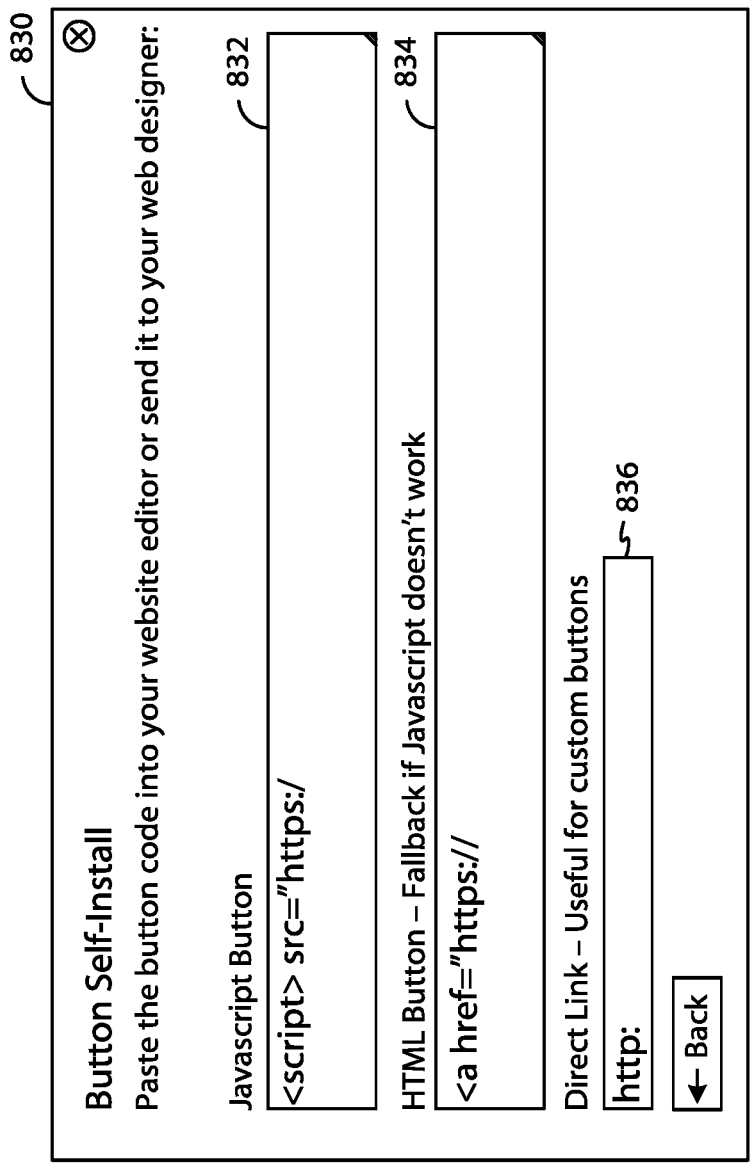
Figure 8E:
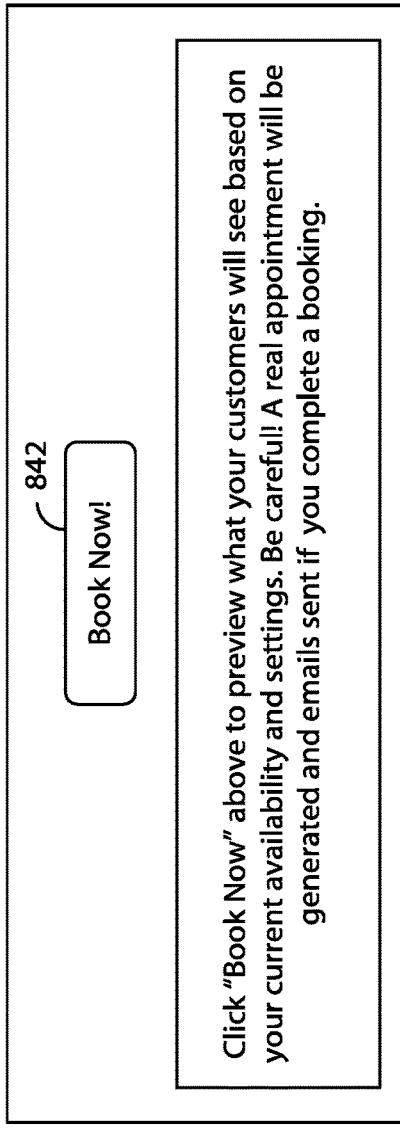
Figure 8F:
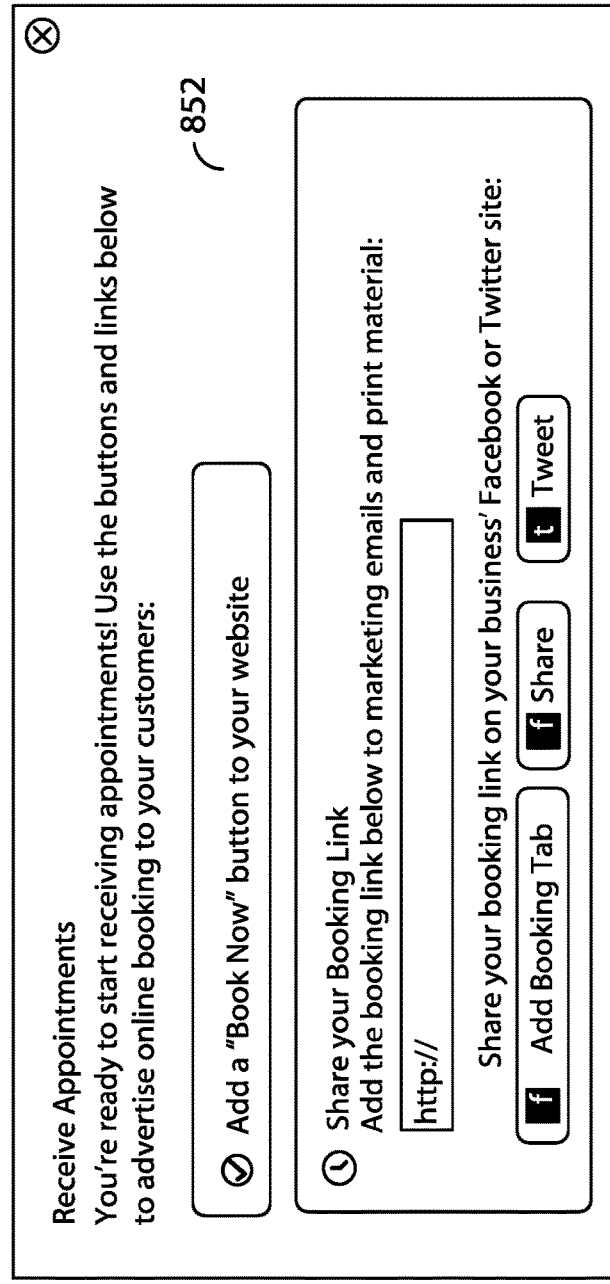

An example preview is shown in FIG. 8E. Client bookings are discussed further in connection with, for example, FIGS. 10A-10F. An additional and/or alternative display, namely display 830 of FIG. 8D, may be used to configure a merchant's website for consumers to access the scheduling system. Areas 832, 834, and 836 provide Javascript code, HTML code, and a direct link reference, respectively, that a merchant user may use to customize a website, allowing consumers to access the scheduling system to schedule appointments.

Display 840 of FIG. 8E provides an example button 842 that may be produced using any of the code described with respect to display 820 and/or 830. Button 842 may provide the merchant with a preview of what a customer may see displayed on the merchant's website. In some embodiments, a display such as display 850 of FIG. 8F, may be presented to a merchant user as including area 852 for sharing a booking link via various social media and/or other third party websites.

Continuing with the displays for configuring settings, in response to option 862 being selected, display 860 may be presented as shown in FIG. 8G. Display 860 can be configured to provide entry and/or modification of the business name, category and/or other merchant information as it would be displayed to consumers.

Moving ahead to when the consumer visits the merchant or otherwise utilize an appointment that was previously scheduled, the merchant may enable the consumer to redeem a deal offer that was purchased. Similarly, the merchant may offer the consumer at the time of purchase an opportunity to purchase a deal offer, such as those generated, marketed and/or sold by a promotional system. A display, such as display 900 of FIG. 9A, can be included in such embodiments of the scheduling system. Display 900 includes information related to both the scheduled appointment(s) and the deal offers, which associates a voucher number (and/or other deal offer identifying information) with one or more particular appointments and enables the merchant to redeem the deal offer when the consumer checks-in for the scheduled appointment, when the consumer pays for the product, or subsequently thereafter (e.g., after the consumer has left the merchant and the merchant's cashier has already given the consumer the monetary value of the deal as a discount).

Figure 9B:
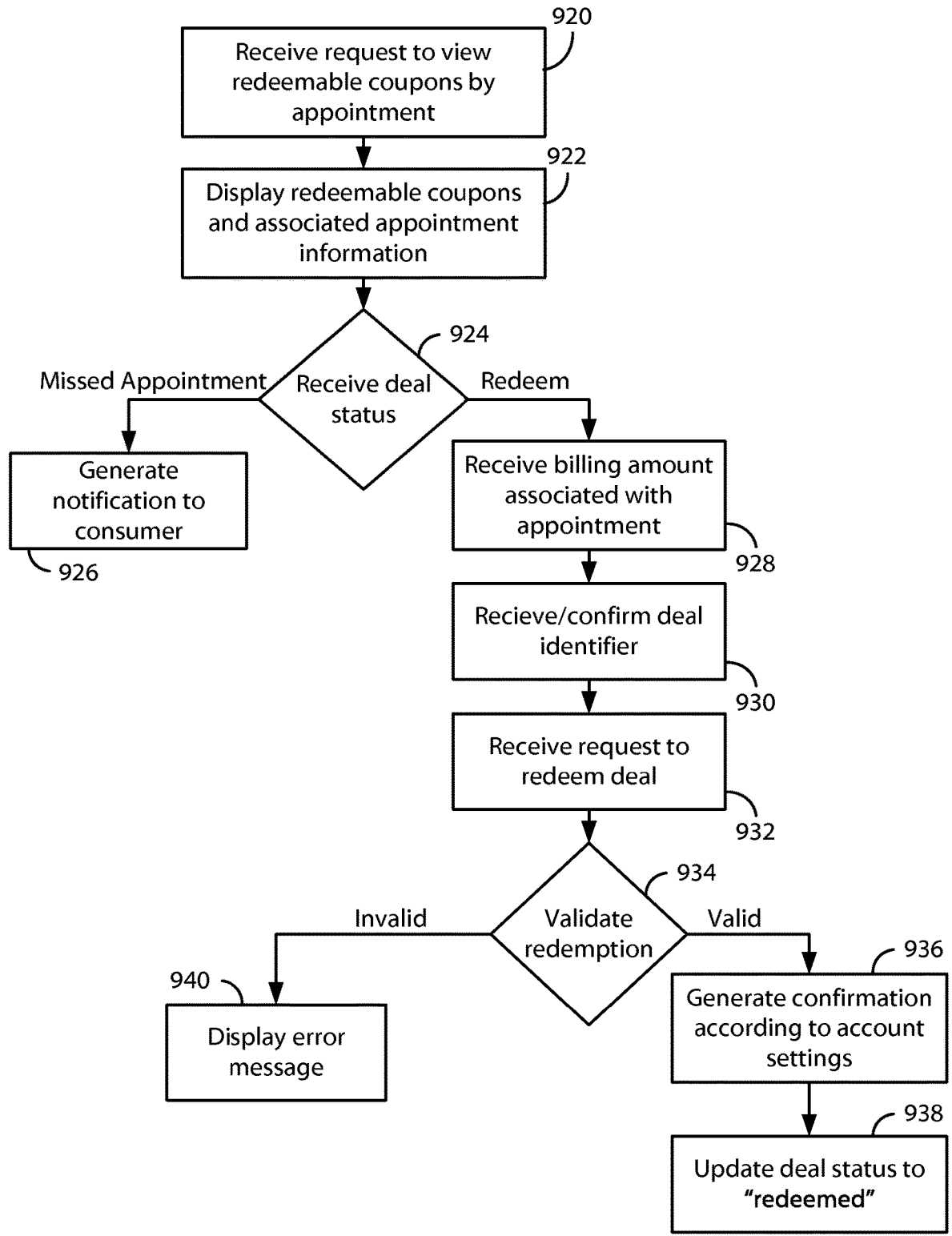
FIG. 9B shows a flow chart illustrating exemplary processes in accordance with some embodiments discussed herein.

A related flow chart according to some embodiments is shown in FIG. 9B. At 920, a merchant may indicate a desire to view a filtered list of past appointments using the scheduling system. For example, the merchant may select a "redeemable" option at user input field 902 on display 900, which may include one or more listings that each have information associated with the appointment (derived from data maintained by the scheduling system) and the deal offer (derived from data maintained by the promotional system).

At 922, display 900 may update to display redeemable deal offer information and/or other associated appointment information. In some embodiments, the deal offer information may be retrieved from a remote database, such as those discussed below in connection with a promotional system. In some embodiments, the deal offer information may be manually entered by the user into user input field 908.

In some embodiments, display 900 may also include a "no show" option, such as option 904, that can be used by the merchant to indicate to the system that a client has missed an appointment without redeeming the associated deal offer. In response to a merchant selecting a "no show" indicator, a determination can be made at 924 of FIG. 9B and the client may receive an email prompting the client to reschedule the missed appointment at 926.

In response to determining at 924 that option 904 has not been selected and/or redeem option 910 being selected, the system may determine that the appointment described in the listing associated with redeem option 910 was held as scheduled. In some embodiments, the total bill amount associated with the products provided during the appointment can be manually entered and/or automatically populated into input field 906 as shown at 928. At 930, the deal identifier can be entered and/or otherwise received and displayed in display 900. In some embodiments, such as those in which a consumer purchases a deal while scheduling an appointment or service, the deal identifier may or may not be displayed, but nevertheless may be associated with the scheduling request, as described with respect to 1072 hereinafter.

In response to receiving an indication that redeem option 910 has been selected at 932 of FIG. 9B, the process proceeds to 934 and the promotional system may be configured to validate the deal identifier and bill amount with respect to appointment details and/or the like. For example, the scheduling system and/or a payment system may communicate over a network with the promotional system that manages the deal offer (and others) to ensure, for example, that the deal identifier has not been used (nor has expired prior to the consumer's appointment), that the deal may be used for the service type, that the total bill amount meets a minimum bill requirement, and/or that the system may enforce any other rules associated with deal redemption. In an instance where validation is successful, a confirmation message can be generated and provided to a client at 936. At 938, the promotional system may receive an indicator of the deal offer's redemption, save the redemption information, and/or update a status of an associated deal in a deal system to "redeemed." Updating the status may ensure the deal is not subsequently used again. In response to determining at 940 that the deal may not be redeemed, an error message can be displayed to the merchant.

Figures 10E, 10F:
Figure 10H:
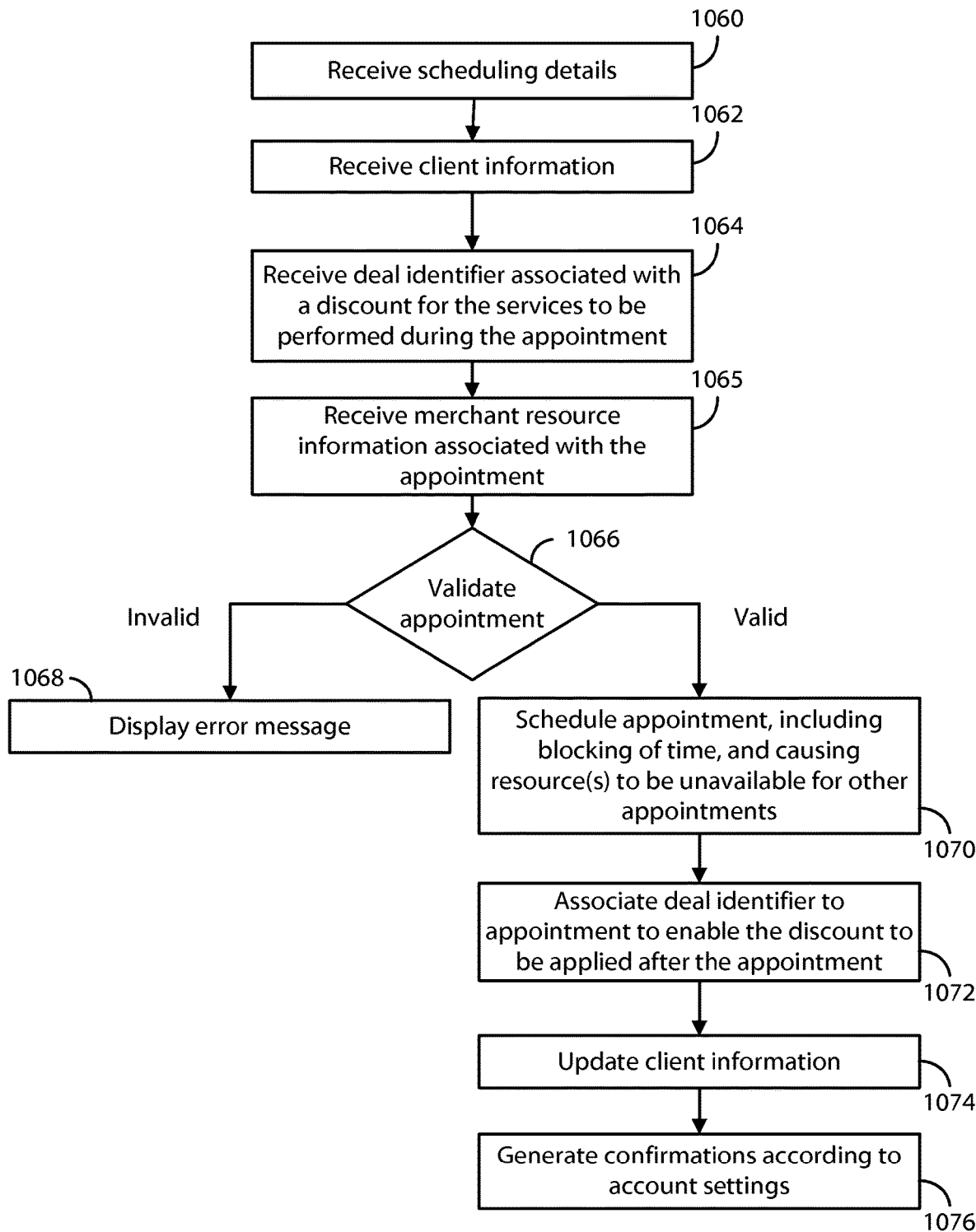
FIG. 10H shows a flow chart illustrating an exemplary process in accordance with some embodiments discussed herein.
Figure 10K:
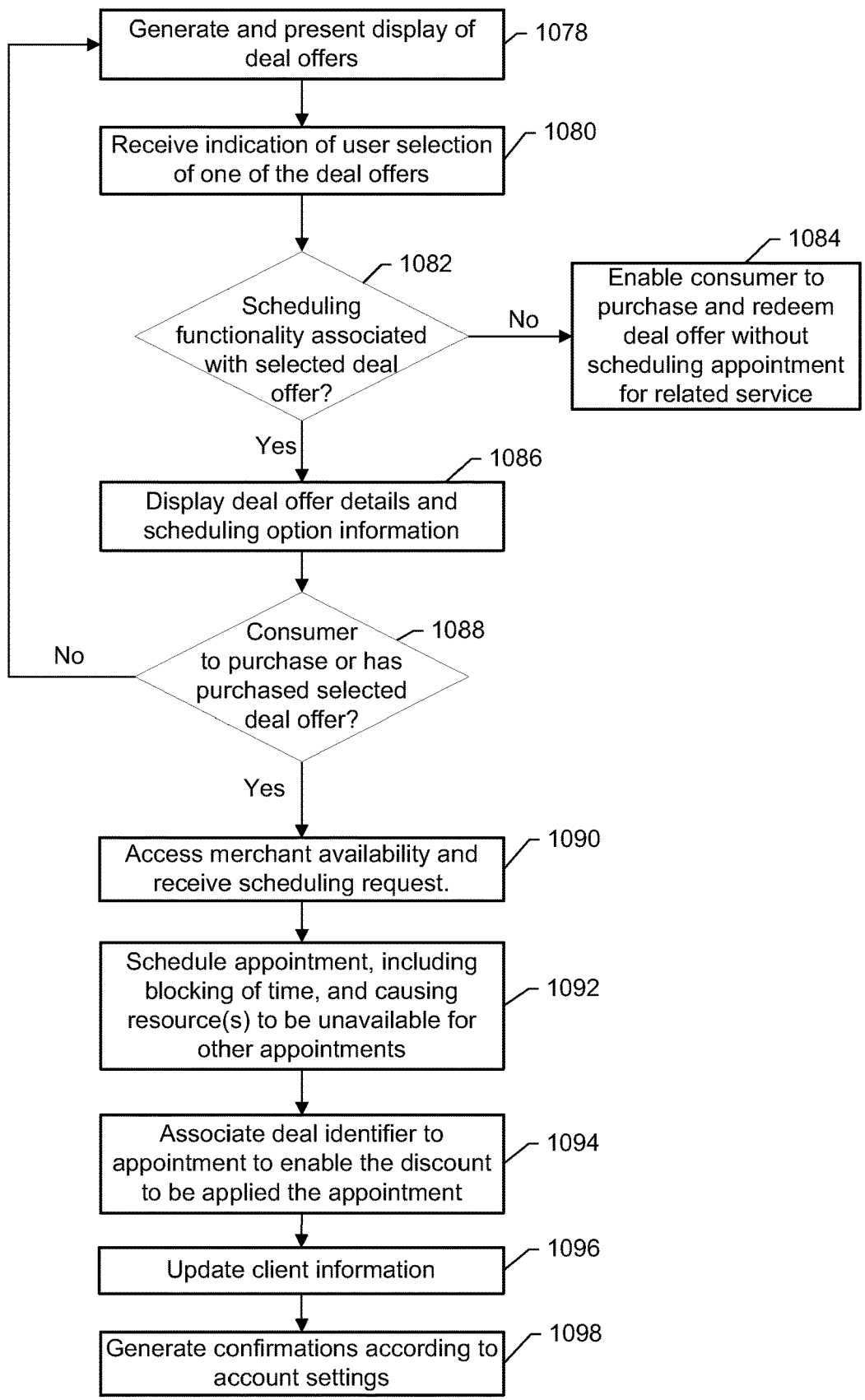
FIGS. 10K and 11 show flow charts illustrating exemplary processes in accordance with some embodiments discussed herein.

FIGS. 10A-10G and show example displays that a consumer may access to schedule an appointment, and FIGS. 10H and 10K show flowcharts of example processes associated with the displays, according to some embodiments. A consumer may access the displays of FIGS. 10A-10J via a consumer device configured to provide a link and/or other type of selectable option. For example, a merchant website, such as one produced by code provided on display 820, may include a link to display, such as display 1000 shown in FIG. 10A. Additionally or alternatively, a consumer may access the displays following purchase of a deal on a promotional system, or by any other method made available to the consumer.

Display 1000 may provide for selection of a location from a plurality of locations associated with a merchant. In area 1002, the locations, as configured by the merchant user with respect to FIGS. 1B-1D, may be presented as listings as shown in FIG. 10A and/or in any other suitable manner. One or more of the locations, such as the location associated with a highlighted listing, may be represented on a map in area 1004 of display 1000. A consumer may use display 1000 to select the merchant location at which the consumer wishes to book an appointment.

For example, subsequent to selecting a location and then next button 1006, display 1010 of FIG. 10B can be presented to the consumer. Display 1010 can include merchant services in area 1012. The services shown in display 1010 can be those configured using, for example, the merchant displays discussed in connection with FIGS. 3A-3E. A listing of available services can also be displayed in listing area 1014.

For example, display 1010 may enable a consumer to view available services and associated details, and may indicate the service type the client would like to schedule.

In FIG. 10C, display 1020 can be configured to include area 1022 for selecting a staff member in response to next button 1016 being selected. Had button 1018 been selected instead, display 1000 may have been presented instead of display 1020. In this example, the staff members available at the particular location and/or to provide the particular service may be configured by the merchant using, e.g., displays of FIGS. 2A-2C. In some embodiments, the available staff members can be presented to the consumer in a dropdown menu (and/or any other format).

Display 1030 of FIG. 10D can be presented in response to next button 1024 being selected. Display 1030 can include available appointment times in area 1032 that are updated based on, e.g., the selected staff member's availability, and as accessed in the scheduling system. In determining what information to present in area 1032, the scheduling system may take into account, for example, other scheduled appointments and/or busy time on the merchant's schedule. Additionally or alternatively, a consumer indicating he/she is redeeming a deal for the service or appointment being scheduled, may be restricted from scheduling during timeframes based on the deal, such as a time-restricted deal for high-demand or low-demand timeframes, and/or be notified of deal-less times. A user may select an appointment opening in area 1032, indicating the day and time of its appointment. Displays 1000-1030 are example displays by which a system may receive scheduling details as shown at operation 1060 of FIG. 10H.

In response to next button 1034 being selected, display 1040 of FIG. 10E can be presented to the consumer. Using display 1040, the consumer may provide personal information (e.g., name, email address, phone number, and/or other potentially relevant information the merchant may ask for or appreciate knowing to accommodate the consumer) using the input fields of area 1042. Some or all of the information may be prefilled if a consumer has previously provided the information (to, e.g., the merchant, a promotional system, other service provider, etc.). For example, a consumer may have provided some or all of the information when purchasing a deal offer from a promotional system, and the scheduling system may access the information from the promotional system and pre-populate the fields for the user. Additionally or alternatively, area 1042 of display 1040 may include a question directed at the consumer, as configured during the setup described with respect to FIG. 3E. A deal indicator, such as a voucher number associated with a purchased deal offer, may likewise or alternatively be prefilled, and/or provided by a consumer. In some embodiments, the voucher number entry field may be dynamically displayed in scenarios in which a consumer has indicated he/she has a deal to redeem (e.g., by selecting an on-screen option associated with having a redeemable deal offer when scheduling an appointment via the merchant's website, or when purchasing a deal offer via a marketing system's website, etc.). For example, when scheduling an appointment after buying a deal offer, the deal offer that was just purchased may be automatically associated with the scheduled appointment. When there is no indication that the consumer has a deal offer applicable to an appointment being scheduled, the voucher number receipt field 1046 may be hidden or otherwise omitted from display 1040. Additionally or alternatively, a selectable option may be provided with any of displays 1000, 1010, 1020, 1030, 1040 and/or 1050, prompting a user to select the option when the user has a deal to redeem, and to subsequently provide the deal offer information such as a voucher number.

In response to the consumer selecting confirm button 1044, the system may determine that the consumer has confirmed all information that is going to be provided has been entered into area 1042. With regards to the process shown in FIG. 10H, any additional consumer information may be collected and/or retrieved at 1062 and/or a deal identifier may be received at 1064. The deal identifier may be a code and/or any other suitable form of information that is associated with a discount for the services to be performed during the appointment. As shown by indicator 1065, merchant resource information may be provided. The merchant resource information may be associated with a resource of the merchant, such as tangible equipment to be used during an appointment and/or at another time by a service provider. As such, resource information may include time required by a service provider to perform the appointment defined by a duration of time and/or a start time and an end time, for example. The merchant resource information may be associated with the appointment so that associated resource(s) may be made unavailable during appointments occurring at the same or overlapping times.

Subsequently, at 1066, a determination can be made whether the appointment is valid. For example, at 1066, the validation functionality may include communications between a promotional system and the scheduling system that the information received, such as the deal offer identifier, is valid. In response to determining the deal offer identifier is invalid and/or there was any other invalid information (e.g., the user information could not be confirmed because it differs from the user information associated with the deal offer information), a display error can be presented at 1068.

Subsequent to determining the information is valid at 1066, display 1050 of FIG. 10F can be presented to the consumer confirming the appointment. For example, area 1052 of display 1050 can include appointment details, such as location, service type(s), appointment time, and/or cancellation policies, among other things.

Returning to FIG. 10H, the scheduling system may be updated, at 1070, to store the scheduled appointment (such as the information received from the consumer). The information stored at 1070 may be used to populate displays presented to the merchant, such as display 600 discussed above. The appointment may be saved such that a resource (s), including a service provider or tangible equipment, for example, is made unavailable during the appointment time or overlapping appointment times. As such, double booking of resources may be prevented.

At 1072, a deal identifier, if provided by the consumer and/or otherwise associated automatically based on the consumer provided information (e.g., by automatically matching the information provided when scheduling an appointment with consumer information provided when purchasing a deal offer associated with the merchant), may be associated with the appointment for future retrieval and display. Similarly, a deal identifier may be stored in session, for example, particularly in a scenario in which a consumer purchased a deal during the same session while scheduling the appointment. Associating the deal identifier to the appointment may enable the discount to be applied to a consumer's bill after the appointment, or prior to being charged for the service, for example.

Additionally or alternatively, at 1074, consumer information may be updated in the scheduling system's client list, by adding a new client, or updating information for an existing client, as provided during the appointment scheduling request. The consumer and/or merchant may be notified of the appointment by email, secure message, according to account settings, as shown at 1076, such as the example notification 1053 of FIG. 10G. The notification may include any appointment information, such as the name of the merchant, appointment date and time, location address, and/or staff member scheduled to provide the service, among other things. The notification may also include a link to view the appointment within the scheduling system.

As another example, a process for scheduling an appointment may originate when purchasing or otherwise claiming a deal and/or other promotional offer. FIG. 10K shows an example of such a process, which may begin by a processor of a networked machine causing the generation and presentation of a deal offers. Example display 1054 of FIG. 10I is an example presentation of available deal offers, such as deal offer 1056, which may be displayed after being served to a networked consumer device (e.g., via a web browser, dedicated application and/or via email, among other things). Other displays discussed herein may be presented to a consumer device and/or merchant device in a similar manner (e.g., pushed and/or pulled via email, dedicated application, and/or a web browser) and/or in any other suitable manner. Although the example presentation of available deal offers are shown in FIG. 10I as being selectable mosaics with pictures and text information, any suitable approach for conveying a deal offer may be provided at 1078.

At 1080, an indication may be received by the promotional system that a consumer has selected a deal offer from those displayed on the consumer device. For example, the promotional system may receive an associated indication of a deal offer selected for purchase and/or for viewing more detailed information.

At 1082, a determination can be made as to whether or not the selected deal offer is associated with a merchant that is involved with a scheduling system in accordance with some embodiments discussed herein. For example, some and/or all deal offers may be associated with a merchant that has used the screens discussed herein to upload and/or otherwise manage their schedules using the scheduling system discussed herein.

In response to determining at 1082 that the selected deal offer is unassociated with the scheduling functionality discussed herein (e.g., the merchant and/or deal offer is not included in the scheduling system), the consumer can still be enabled to purchase and/or redeem the selected deal offer without scheduling an appointment for any potentially related services at 1084.

In response to determining at 1082 that the selected deal offer is associated with the scheduling functionality, the promotional system can cause a consumer device to display deal offer details and/or scheduling option information (1086). For example, FIG. 10J shows a display, namely display 1058, that may be presented subsequent to a purchase selection of a deal offer associated with scheduling functionality. Display 1058 may include a scheduling option, such as scheduling option 1059, that a consumer may select to indicate they wish to schedule a service or appointment and apply the selected deal offer thereto.

At 1088, a determination can be made whether the consumer has purchased or is to purchase the selected deal offer. If not, the available deal offers can be presented again at 1078. If so, merchant availability information associated with the merchant can be accessed and scheduling information can be presented at 1090. For example, a determination can be made of a selection of the scheduling option 1059 and, in response, a consumer may be directed to a display, such as display 1000, allowing the consumer to schedule the service associated with the selected and/or recently purchased deal offer. According to some embodiments, some or all of the information, such as the information collected with regard to displays 1000, 1010, 1020, 1030, 1040, and/or 1050, may be prefilled based on earlier interactions during the session. For example, information entered by the merchant and/or otherwise indicative of when the merchant is available and/or unavailable for the type of service associated with the selected deal offer may be presented to the consumer at 1090. Also, the promotional system can be configured to receive at 1090 a scheduling request comprising scheduling details (e.g., the user selection of a particular time that was identified as being currently available for one or more services by the merchant).

At 1092, the promotional system and/or the merchant device(s) can facilitate the scheduling an appointment based on the scheduling request. In doing so, the merchant availability information can be updated based on the scheduling details.

At 1094, The deal identifier associated with the selected deal offer, which may have been purchased or is about to be purchased, can be associated with the scheduled appointment by the merchant device, the promotional device and/or the consumer device. The discount associated with the selected deal offer may be applied to the cost of the services associated with the scheduled appointment after, during and/or before the appointment takes place and/or the services are provided. For example, a deal identifier, such as a code (e.g., numeric, alpha-numeric, barcode, QR code, etc.) can be received that is associated with the selected deal offer, wherein the deal identifier is associated with a discount for the services to be performed in connection with the appointment.

At 1096, consumer information may be updated in the scheduling system's client list, by adding a new client, or updating information for an existing client, as provided during the appointment scheduling request. The consumer and/or merchant may be notified of the appointment by email, secure message, according to account settings, as shown at 1098, such as the example notification 1053 of FIG. 10G. The notification may include any appointment information, such as the name of the merchant, appointment date and time, location address, and/or staff member scheduled to provide the service, among other things. The notification may also include a link to view the appointment within the scheduling system.

In this regard, the consumer may select to schedule a service during the same online session that a deal offer for the service is purchased. As sometimes referred to herein, "session" includes a series of transactions that can be performed sequentially by selecting links within various webpages during a single, unbroken string of interactions. For example, a session may end when the user stops selecting links within a webpage and instead enters a new web address manually or searches for a new web address using a search engine.

Figure 11:
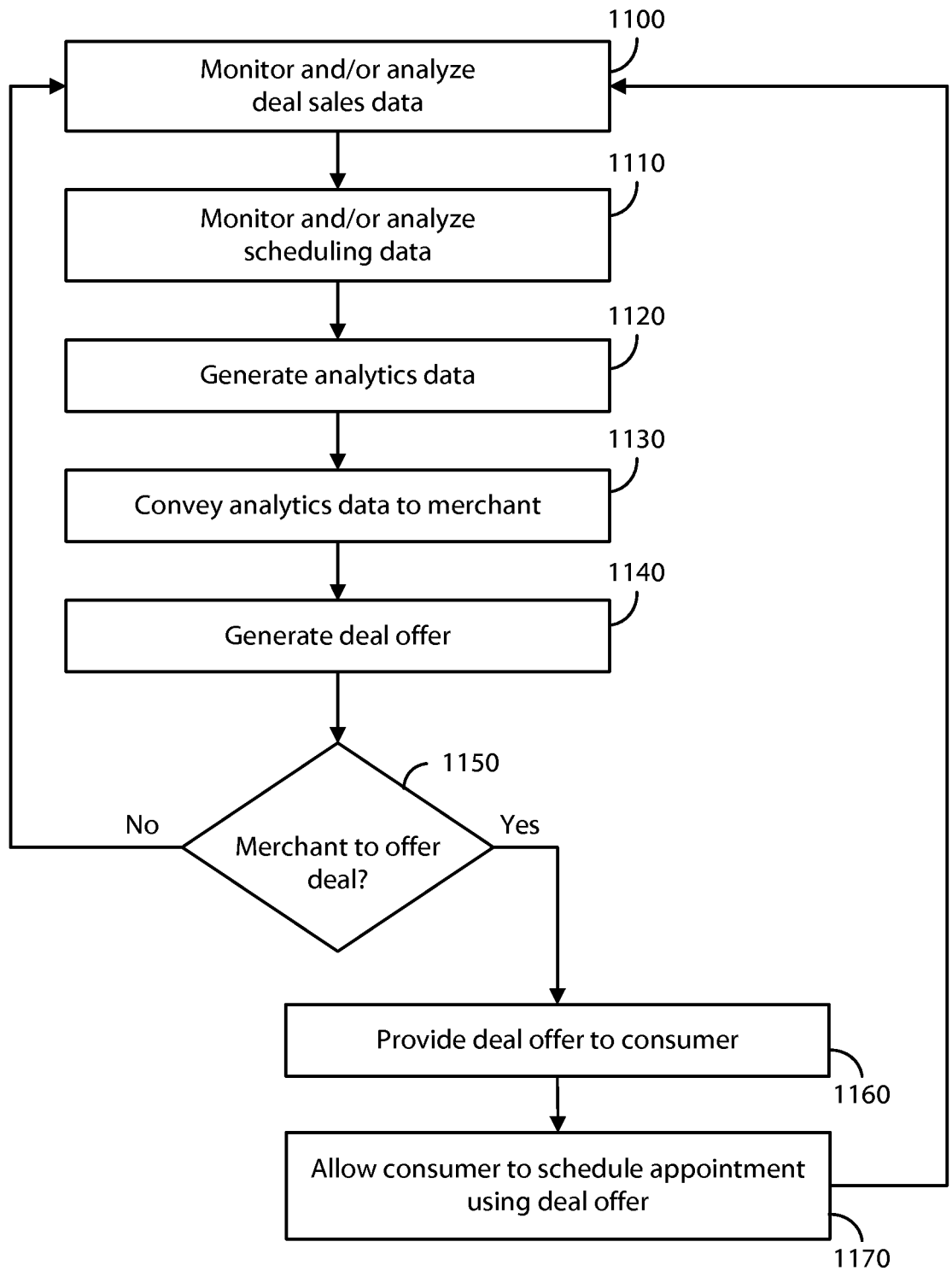

FIG. 11 is a flowchart showing an example promotional method. For example, at 1100, a promotional system may monitor and/or analyze the sales of deals for one or more particular merchants and the details associated therewith (such as, for example, deal offer cost, deal offer discount amount, quantity sold, etc.). For example, the promotional system may track the quantities of deal offer sold, and the types of services the deals are for.

At 1110, the promotional system may monitor and/or analyze scheduling data by, for example, utilizing information collected from displays presented to merchants and/or consumers, such as those discussed above. For example, the promotional system can be configured to identify patterns in availability over a period of time, determine when consumers are not likely to schedule an appointment, and/or determine when the merchant has available appointments. The promotional system may be additionally or alternatively configured to determine a correlation between a type of appointment and a time of day and/or week the appointment type is likely or unlikely to be scheduled.

At 1120, the promotional system may generate analytics data that may be based on, for example, any combination of sales and scheduling data. Analytics data generation may include correlating sales and scheduling data. For example, the analytics data may comprise statistics pertaining to a deal offer's effect on a merchant's schedule. In some embodiments, the analytics data may indicate what number and/or percentage of appointments were booked using a deal offer and/or whether or not a deal offer is likely to increase the scheduling of appointments for times and/or products that have been (relatively) underutilized. As such, the analytics data may comprise historic trending data based on past deal offers and scheduling data associated with a deal, such as an indication that a deal offer has caused an increase in scheduling of appointments.

The analytics data may be conveyed to a merchant at 1130. Such information may be illustrated by way of a deal system and/or scheduling system. For example, display 600 may be updated to reflect which appointments on the merchant schedule were booked using a deal by displaying, for example, such appointments in a different color or font. Analytics data may also be displayed in a more direct fashion, such as a banner or advertisement on any of the displays of FIGS. 1A-9A provided to merchants, which suggest to the merchant a deal offer that could be provided to consumers to fill empty appointment timeslots. Additionally or alternatively, one or more emails may be generated by the promotional system and sent to one or more merchants, wherein the email(s) illustrate some or all of the analytics data on some regularly defined interval, or for example, following a deal offer.

At 1140, a promotional system may utilize the analytics data in order to generate additional deal offers to be provided by a deal system. In some embodiments, 1140 may only be executed in response to the merchant authorizing such functionality either ad hoc (e.g., in response to an advertisement for a particular deal offer and/or in response to the merchant indicating a desire to enable any recommended promotional campaign recommended by the promotional system). Any combination of data may be used to generate a new deal offer to fill a need based on the merchant's schedule and/or other available information, for example, any information collected and/or analyzed in regards to 1100-1130. A deal offer may be generated and/or proposed to a merchant based on scheduling patterns, and when consumers are more or less likely to schedule an appointment, and/or a time of day/week when a particular appointment type is identified as likely or unlikely to be scheduled. For example, a promotional system may recognize one or more time periods during which consumers are more likely to schedule an appointment, and propose a high-demand deal offer to a merchant. Similarly, a promotional system may identify time periods during which consumers are less likely to schedule an appointment, and propose a low-demand deal offer to a merchant. The high-demand deal offers may have a smaller discount than that of a standard deal offer (e.g., the deal offer unassociated with or unrestricted to a specific timeframe). The low-demand deal offer may have a greater discount than a standard deal offer. As such, consumers seeking deeper discounts may be inclined to schedule appointments at off-peak hours (as determined automatically by embodiments discussed herein), therefore providing more efficient financial incentives to more evenly fill a merchant's schedule (e.g., time) and/or utilize other available resources. Any time-restricted deal offer such as a high-demand deal offer and/or low-demand deal offer may be presented to a consumer while scheduling an appointment using a deal, or browsing deal offers for purchase. For example, the consumer may see different values associated with different deal offers for various times on a calendar. As such, a merchant may use the scheduling system (such as that discussed above) to configure timeframes for which certain deals are valid or invalid, the scheduling availability may automatically reflect those restrictions, and a consumer may be restricted to scheduling appointments during a specific timeframe while using a time-restricted deal.

In addition to, or as an alternative to generating time-restricted deal offers, offers may be targeted to past clients of the merchant and/or other consumers to encourage, for example, trial of a different service than what those consumers may have previously scheduled, rescheduling those that have been performed within a given period of time (e.g., provide an offer for a discount if a follow-up appointment is booked within a day of the last appointment and/or the follow-up is scheduled to take place within two months of the first appointment), etc. As other examples, offers may include a discounted service to consumers who often schedule another type of related service, and/or for bookings have lapsed for a specific amount of time.

Regardless of the promotional technique used to generate an offer, at 1150, a merchant may decide whether or not it will offer the deal to a client or clients. If the merchant decides not to market the deal offer that was generated, the process returns to 1100. In response to determine the merchant has decided to market the deal offer to consumers, the deal may be offered to consumers at 1160 by use of a marketing system, for example.

At 1170, the consumer may choose to schedule an appointment in response to being provided the deal offer. A consumer who chooses to purchase the deal and/or otherwise schedule an appointment may be presented with a display such as those shown in FIGS. 10A-10F for scheduling an appointment.

Thereafter, the promotional system may return to monitoring sales and scheduling data and generate offers to improve a merchant's business and provide consumers reduced prices on products the consumers are interested in purchasing.

Figure 12:
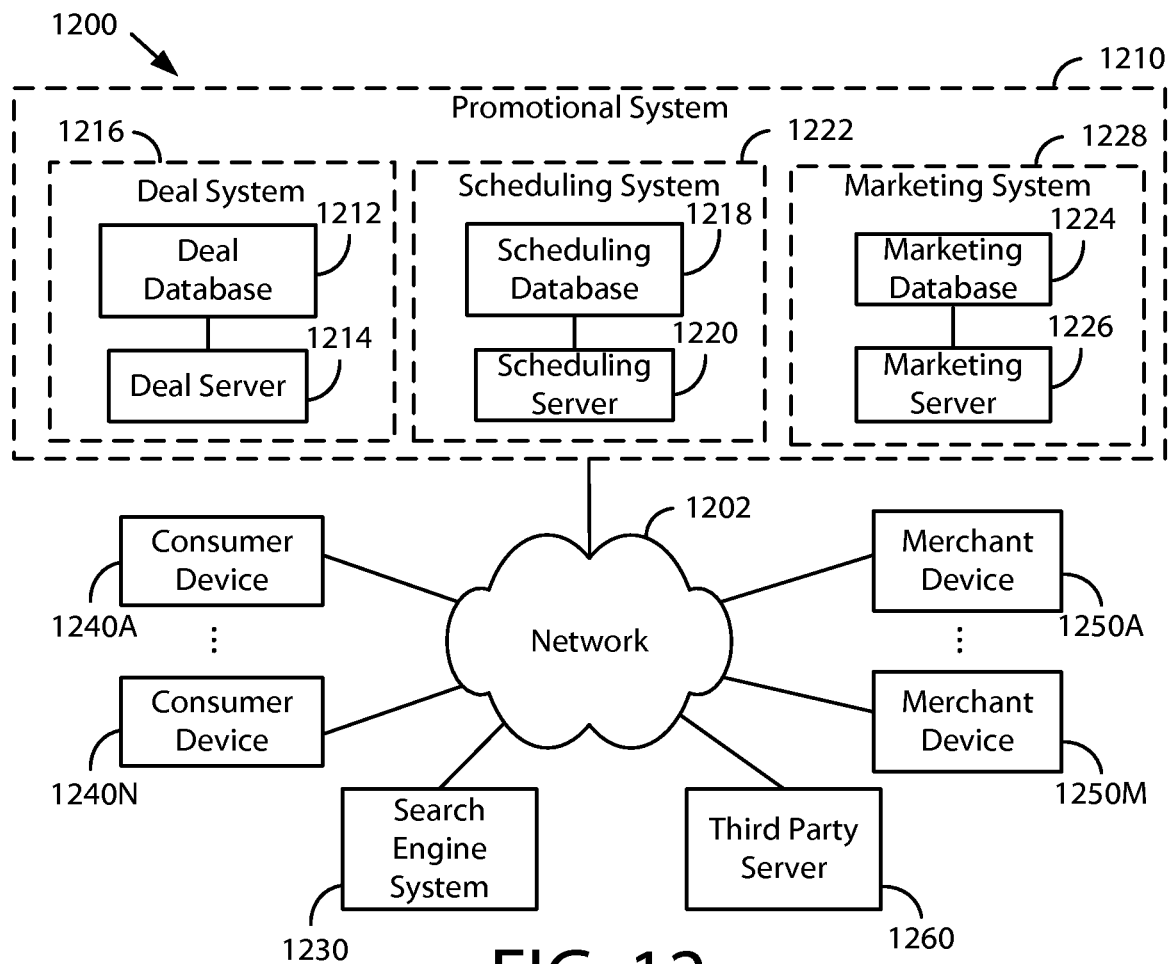
FIG. 12 shows an example system in accordance with some embodiments discussed herein.

FIG. 12 shows system 1200, including an example network architecture for a retailing system, which may include one or more devices and sub-systems that are configured to implement some embodiments discussed herein. For example, system 1200 may include promotional system 1210, which may include, for example, deal database 1212 and deal server 1214, (sometimes collectively referred to herein as deal system 1216), scheduling database 1218 and scheduling server 1220 (sometimes collectively referred to herein as scheduling system 1222), and promotional database 1224 and promotional server 1226 (sometimes collectively referred to herein as marketing system 1228), among other things (not shown).

Deal server 1214, scheduling server 1220, and/or promotional server 1226 may each be any suitable network server and/or other type of processing device, and may be implemented on a single server or distributed, in any combination, among several servers.

Deal database 1212, scheduling database 1218, and/or promotional database 1224 may be any suitable network database configured to store respective information and/or analytics data, such as information discussed herein that may be received from the displays discussed above and/or generated therefrom. Each of deal database 1212, scheduling database 1218, and/or promotional database 1224 may be implemented as a single database or distributed among several databases. As such, a promotional system 1210 may be implemented using a variety of architectures, where deal system 1216, scheduling system 1222, and marketing system 1228 may be implemented independently, as a single device, or according to any desired architecture.

Promotional system 1210 can be coupled to one or more consumer devices 1240A-1240N and/or one or more merchant devices 1250A-1250M via network 1202. In this regard, network 1202 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 1202 may include a cellular telephone, an 802.11, 802.16, 802.20, and/or WiMax network. Further, network 1202 may include a public network, such as the Internet, a private network, such as an intranet, or combinations thereof, and may utilize a variety of networking protocols now available or later developed including, but not limited to TCP/IP based networking protocols.

Consumer devices 1240A-1240N and/or merchant devices 1250A-1250M may each be implemented as a personal computer and/or other networked device, such as a cellular phone, tablet computer, mobile device, etc., that may be used for any suitable purpose in addition to configuring any component of a promotional system and/or using a promotional system to schedule appointments, redeem deals, and/or the like. The depiction in FIG. 12 of "N" consumer devices and "M" merchant devices is merely for illustration purposes. System 1200 may also include at least one search engine system 1230 and/or third party server 1260, among other things, to enable other functionality that may be used to provide and/or enhance the services discussed herein.

Figure 13:
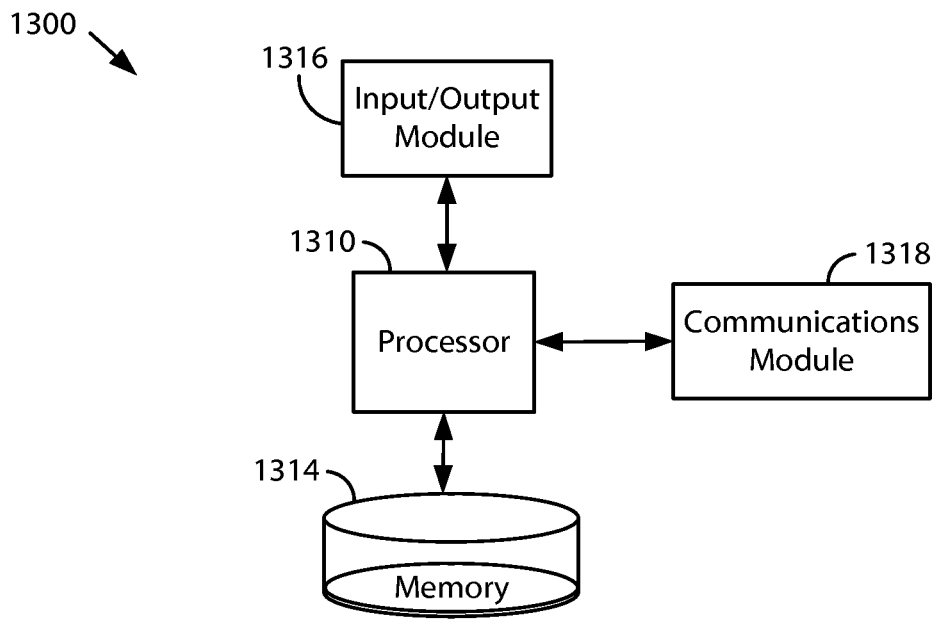
FIG. 13 shows a schematic block diagram of circuitry that can be included in a computing device, such as a merchant device, consumer device and/or promotional system, in accordance with some embodiments discussed herein.

FIG. 13 shows a schematic block diagram of circuitry 1300, some or all of which may be included in, for example, promotional system 1210, consumer devices 1240A-1240N and/or merchant devices 1250A-1250M. As illustrated in FIG. 13, in accordance with some example embodiments, circuitry 1300 may include various means, such as processor 1310, memory 1314, input/output module 1316, and/or communications module 1318. The means of circuitry 1300 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 1314) that is executable by a suitably configured processing device (e.g., processor 1310), or some combination thereof, to provide the functionality discussed herein, including presenting the displays discussed above, receiving information, and communicating with remote devices.

Processor 1310 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 13 as a single processor, in some embodiments, processor 1310 comprises a plurality of processors. The plurality of processors may be embodied on a single computing device or may be distributed across a plurality of computing devices collectively configured to function as circuitry 1300. The plurality of processors may be in operative communication with each other and may be collectively configured to perform one or more functionalities of circuitry 1300 as described herein. In some example embodiments, processor 1310 may be configured to execute instructions stored in memory 1314 or otherwise accessible to processor 1310. These instructions, when executed by processor 1310, may cause circuitry 1300 to perform one or more of the functionalities of circuitry 1300 as described herein.

Whether configured by hardware, firmware/software methods, or by a combination thereof, processor 1310 may comprise an entity capable of performing operations according to embodiments of the present invention while configured accordingly. Thus, for example, when processor 1310 is embodied as an ASIC, FPGA or the like, processor 1310 may comprise specifically configured hardware for conducting one or more operations described herein. Alternatively, as another example, when processor 1310 is embodied as an executor of instructions, such as may be stored in memory 1314, the instructions may specifically configure processor 1310 to perform one or more algorithms and operations described herein.

Memory 1314 may comprise, for example, volatile memory, non-volatile memory, or some combination thereof. Although illustrated as a single memory, memory 1314 may comprise a plurality of memory components. The plurality of memory components may be embodied on a single computing device or distributed across a plurality of computing devices. In various embodiments, memory 1314 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 1314 may be configured to store information, data (including deal parameter data and/or analytics data), applications, instructions, or the like for enabling circuitry 1300 to carry out various functions in accordance with example embodiments of the present invention. For example, in at least some embodiments, memory 1310 is configured to buffer input data for processing by processor 1310. Additionally or alternatively, in at least some embodiments, memory 1314 is configured to store program instructions for execution by processor 1310. Memory 1314 may store information in the form of static and/or dynamic information. This stored information may be stored and/or used by circuitry 1300 during the course of performing its functionalities.

Input/output module 1316 may be in communication with processor 1310 to receive an indication of a user input and/or to provide an audible, visual, mechanical, or other output to a user (e.g., merchant and/or consumer). Some example visual outputs that may be provided to a user by circuitry 1300 are discussed in connection with the displays described herein. As such, input/output module 1316 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 900 is embodied as a server or database, aspects of input/output module 1316 may be reduced as compared to embodiments where circuitry 1300 is implemented as an end-user machine (e.g., consumer device and/or merchant device) or other type of device designed for complex user interactions. In some embodiments (like other components discussed herein), input/output module 1316 may even be eliminated from circuitry 1300. Alternatively, such as in embodiments wherein circuitry 1300 is embodied as a server or database, at least some aspects of input/output module 1316 may be embodied on an apparatus used by a user that is in communication with circuitry 1300. Input/output module 1316 may be in communication with the memory 1314, communications module 1318, and/or any other component (s), such as via a bus. Although more than one input/output module and/or other component can be included in circuitry 1300, only one is shown in FIG. 13 to avoid overcomplicating the drawing (like the other components discussed herein).

Communications module 1318 may be embodied as any device or means embodied in circuitry, hardware, a computer program product comprising computer readable program instructions stored on a computer readable medium (e.g., memory 1314) and executed by a processing device (e.g., processor 1310), or a combination thereof that is configured to receive and/or transmit data from/to another device, such as, for example, a second circuitry 1300 and/or the like. In some embodiments, communications module 1318 (like other components discussed herein) can be at least partially embodied as or otherwise controlled by processor 1310. In this regard, communications module 1318 may be in communication with processor 1310, such as via a bus. Communications module 1318 may include, for example, an antenna, a transmitter, a receiver, a transceiver, network interface card and/or supporting hardware and/or firmware/software for enabling communications with another computing device.

Communications module 1318 may be configured to receive and/or transmit any data that may be stored by memory 1314 using any protocol that may be used for communications between computing devices. Communications module 1318 may additionally or alternatively be in communication with the memory 1314, input/output module 1316 and/or any other component of circuitry 1300, such as via a bus.

In some embodiments, where FIG. 13 represents a promotional system, some or all of the functionality described herein may be performed by processor 1310. In this regard, the example processes and algorithms discussed herein can be performed by at least one processor 1310. For example, non-transitory computer readable media can be configured to store firmware, one or more application programs, and/or other software, which include instructions and other computer-readable program code portions that can be executed to control each processor (e.g., processor 1310) of the components of system 1200 to implement various operations, including the examples shown above. As such, a series of computer-readable program code portions are embodied in one or more computer program products and can be used, with a computing device, server, and/or other programmable apparatus, to produce machine-implemented processes.

As will be appreciated, any such computer program instructions and/or other type of code may be loaded onto a computer, processor or other programmable apparatus' circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of system 1200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 1310 to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 1314) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for modifying a scheduling database to reflect deal data received via a deal server and scheduling data received via a network router from a plurality of merchant devices and consumer devices operative in a network, the system comprising:
a merchant scheduling interface operative on a merchant device, wherein the merchant scheduling interface is configured to receive first merchant inputs comprising at least a maximum percentage of deal-redeeming appointments allowed to be scheduled in a given period relative to a total number of appointments in the given period, wherein the deal-redeeming appointments are appointments in which a consumer redeems a deal for at a least partial payment of the respective deal-redeeming appointment,
the merchant scheduling interface further configured to generate scheduling data based on the first merchant inputs, wherein the scheduling data comprises the maximum percentage of deal-redeeming appointments applied to merchant availability information, and previously scheduled deal-redeeming appointments,
the merchant scheduling interface further configured to receive the merchant information comprising days and times an individual resource is available for appointments, and a time interval on which a consumer can schedule an appointment for a specific service type; a consumer interface operative on a consumer device, wherein the consumer interface is configured to transmit a request for scheduling in response to consumer inputs, wherein the request for scheduling comprises a selected deal redemption and a merchant identifier, the selected deal redemption comprising a voucher for the appointment costing less than full price; and
a scheduling server configured to correlate (a) the deal data received via the deal server with (b) scheduling data received via the network router from the plurality of the merchant devices and the consumer devices, such that the scheduling server receives the scheduling data from the merchant device and the request for scheduling from the consumer device, wherein the scheduling server is further configured to access the deal server comprising a deal database to determine whether the selected deal redemption is associated with the scheduling data, and in an instance in which the selected deal redemption is associated with the scheduling data, the scheduling server is configured to: (a) determine a first set of appointment times comprising available appointment times configured to be available to be scheduled as deal-redeeming appointments, (b) reduce the first set of appointment times to a second set of appointment times by removing at least one appointment time that if scheduled as a deal-redeeming appointment, would result in a percentage of deal-redeeming appointments within the given period exceeding the maximum percentage of deal-redeeming appointments allowed to be scheduled in the given period, based on the selected deal redemption, the merchant availability information and on the scheduling data, wherein the scheduling server is further configured to modify the scheduling database with the scheduling data, and wherein the scheduling server is further configured to transmit instructions to the consumer device for displaying the second set of available appointment times via the consumer interface, the second set of available appointment times comprising only available appointment times for which a deal may be redeemed and excluding appointment times that are available but for which a consumer is not permitted to redeem a deal based on the scheduling data and the maximum percentage of appointments, and wherein the merchant scheduling interface is further configured to receive second merchant inputs and to generate updated scheduling data based on the second merchant inputs, wherein the scheduling server is configured to process the data received via the network router such that the scheduling server receives the updated scheduling data from the merchant scheduling interface and the scheduling server is further configured to access the deal server comprising the deal database to determine whether the selected deal redemption is associated with the updated scheduling data, and in an instance in which the selected deal redemption is associated with the updated scheduling data the scheduling server is configured to reduce the second set of available appointment times to determine a third set of available appointment times based on the selected deal redemption, the maximum percentage of appointments within the given period, and on the updated scheduling data, wherein the scheduling server is further configured to modify the scheduling database with the updated scheduling data, wherein the scheduling server is further configured to transmit instructions to the consumer device for displaying the third set of available appointments times via the consumer interface, wherein the voucher is applied to a selected appointment of the third set of available appointment times, enabling the discount to be applied at the selected appointment of the third set of available appointment times, and wherein the scheduling server is further configured to analyze the scheduling data to identify an unscheduled service time at a merchant and access the deal database to generate a new deal offer based on at least the scheduling data, the generated new deal offer made available for sale in advance of the unscheduled service time and made available for redemption at the merchant during the unscheduled service time.

2. The system of claim 1, wherein at least one of the first merchant inputs or second merchant inputs indicate merchant resource information, wherein the scheduling data is generated further based on the merchant resource information, and wherein the available appointment times reflect the merchant resource information.

3. The system of claim 1, wherein the merchant resource information comprises information relating to tangible equipment required to perform appointments, and wherein the scheduling data is generated further based on the information relating to the tangible equipment.

4. The system of claim 1, wherein the merchant resource information comprises a time duration required by a service provider to perform a specific type of appointment, and wherein the scheduling data is generated further based on the time duration.

5. The system of claim 1, wherein the consumer interface is further configured to receive a consumer scheduling request associated with the selected deal redemption and cause transmission of the consumer scheduling request to the scheduling server, and wherein the scheduling server is further configured to cause transmission of the consumer scheduling request to be provided via the merchant scheduling interface.

6. The system of claim 1, wherein the scheduling server is further configured to: identify patterns in availability over a period of time;
determine when consumers are less likely to schedule an appointment based on the identified patterns; and
generate a proposal for the new deal offer based on when consumers are less likely to schedule an appointment.

7. The system of claim 1, wherein the scheduling server is further configured to: determine when consumers are more likely to schedule an appointment from the patterns; and
generate a proposal for a high-demand deal offer based on when consumers are more likely to schedule an appointment, wherein the high-demand deal offer indicates a deal that is discounted less than that of the selected deal offer.

8. The system according to claim 1, wherein the second set of appointment times comprise only the available appointment times for which a deal may be redeemed to pay less than the full price, and excludes appointment times that are available at the full price, but for which a consumer is not permitted to redeem a deal.

9. An apparatus for modifying a scheduling database to reflect deal data received via a deal server and scheduling data received via a network router from a plurality of merchant devices and consumer devices operative in a network, the apparatus comprising at least processing circuitry and at least one memory configured to cause to provide at least:

a merchant scheduling interface operative on a merchant device, wherein the merchant scheduling interface is configured to receive first merchant inputs comprising at least a maximum percentage of deal-redeeming appointments allowed to be scheduled in a given period relative to a total number of appointments in the given period, wherein the deal-redeeming appointments are appointments in which a consumer redeems a deal for at a least partial payment of the respective deal-redeeming appointment, the merchant scheduling interface further configured to receive the merchant information comprising days and times an individual resource is available for appointments, and a time interval on which a consumer can schedule an appointment for a specific service type;

the merchant scheduling interface further configured to generate scheduling data based on the first merchant inputs, wherein the scheduling data comprises the maximum percentage of deal-redeeming appointments applied to merchant availability information, and previously scheduled deal-redeeming appointments;

a consumer interface operative on a consumer device, wherein the consumer interface is configured to transmit a request for scheduling in response to consumer inputs, wherein the request for scheduling comprises a selected deal redemption and a merchant identifier, the selected deal redemption comprising a voucher for the appointment costing less than full price; and a scheduling server configured to correlate (a) the deal data received via the deal server with (b) scheduling data received via the network router from the plurality of the merchant devices and the consumer devices, such that the scheduling server receives the scheduling data from the merchant device and the request for scheduling from the consumer device, wherein the scheduling server is further configured to access the deal server comprising a deal database to determine whether the selected deal redemption is associated with the scheduling data, and in an instance in which the selected deal redemption is associated with the scheduling data, the scheduling server is configured to: (a) determine a first set of appointment times comprising available appointment times configured to be available to be scheduled as deal-redeeming appointments, (b) reduce the first set of appointment times to a second set of appointment times by removing at least one appointment time that if scheduled as a deal-redeeming appointment, would result in percentage of deal-redeeming appointments within the given period exceeding the maximum percentage of deal-redeeming appointments allowed to be scheduled in the given period, based on the selected deal redemption, the merchant availability information and on the scheduling data, wherein the scheduling server is further configured to modify the scheduling database with the scheduling data, and wherein the scheduling server is further configured to transmit instructions to the consumer device for displaying the second set of available appointment times via the consumer interface, the second set of available appointment times comprising only available appointment times for which a deal may be redeemed and excluding appointment times that are available but for which a consumer is not permitted to redeem a deal, and wherein the merchant scheduling interface is further configured to receive second merchant inputs and to generate updated scheduling data based on the second merchant inputs, wherein the scheduling server is configured to process the data received via the network router such that the scheduling server receives the updated scheduling data from the merchant scheduling interface and the scheduling server is further configured to access the deal server comprising the deal database to determine whether the selected deal redemption is associated with the updated scheduling data, and in an instance in which the selected deal redemption is associated with the updated scheduling data the scheduling server is configured to reduce the second set of available appointment times to determine a third set of available appointment times based on the selected deal redemption, the maximum percentage of appointments within the given period, and on the updated scheduling data, wherein the scheduling server is further configured to modify the scheduling database with the updated scheduling data, and wherein the scheduling server is further configured to transmit instructions to the consumer device for displaying the third set of available appointment times via the consumer interface, wherein the voucher is applied to a selected appointment of the third set of available appointment times, enabling the discount to be applied at the selected appointment of the third set of appointment times, and wherein the scheduling server is further configured to analyze the scheduling data to identify an unscheduled service time at a merchant and access the deal database to generate a new deal offer based on at least the scheduling data, the generated new deal offer made available for sale in advance of the unscheduled service time and made available for redemption at the merchant during the unscheduled service time.

10. The apparatus of claim 9, wherein at least one of the first merchant inputs or second merchant inputs indicate merchant resource information, wherein the scheduling data is generated further based on the merchant resource information, and wherein the available appointment times reflect the merchant resource information.

11. The apparatus of claim 9, wherein the merchant resource information comprises information relating to tangible equipment required to perform appointments, and wherein the scheduling data is generated further based on the information relating to the tangible equipment.

12. The apparatus of claim 9, wherein the merchant resource information comprises a time duration required by a service provider to perform a specific type of appointment, and wherein the scheduling data is generated further based on the time duration.

13. The apparatus of claim 9, wherein the consumer interface is further configured to receive a consumer scheduling request associated with the selected deal redemption and cause transmission of the consumer scheduling request to the scheduling server, and wherein the scheduling server is further configured to cause transmission of the consumer scheduling request to be provided via the merchant scheduling interface.

14. The apparatus according to claim 9, wherein the second set of appointment times comprise only the available appointment times for which a deal may be redeemed to pay less than the full price, and excludes appointment times that are available at the full price, but for which a consumer is not permitted to redeem a deal.

15. A computer program product for modifying a scheduling database to reflect deal data received via a deal server and scheduling data received via a network router from a plurality of merchant devices and consumer devices operative in a network, the computer program product comprising at least one non-transitory computer-readable medium having computer-readable program instructions stored therein, the computer-readable program instructions comprising instructions, which when performed by an apparatus, are configured to cause the apparatus to provide at least:

a merchant scheduling interface operative on a merchant device, wherein the merchant scheduling interface is configured to receive first merchant inputs comprising at least a maximum percentage of deal-redeeming appointments allowed to be scheduled in a given period relative to a total number of appointments in the given period, wherein the deal-redeeming appointments are appointments in which a consumer redeems a deal for at a least partial payment of the respective deal-redeeming appointment, to generate scheduling data based on the first merchant inputs, wherein the scheduling data comprises the maximum percentage of deal-redeeming appointments applied to merchant availability information, and previously scheduled deal-redeeming appointments, the merchant scheduling interface further configured to receive the merchant information comprising days and times an individual resource is available for appointments, and a time interval on which a consumer can schedule an appointment for a specific service type; a consumer interface operative on a consumer device, wherein the consumer interface is configured to transmit a request for scheduling in response to consumer inputs, wherein the request for scheduling comprises a selected deal redemption and a merchant identifier, the selected deal redemption comprising a voucher for the appointment costing less than full price; and a scheduling server configured to correlate (a) the deal data received via the deal server with (b) scheduling data received via the network router from the plurality of the merchant devices and the consumer devices, such that the scheduling server receives the scheduling data from the merchant device and the request for scheduling from the consumer device, wherein the scheduling server is further configured to access the deal server comprising a deal database to determine whether the selected deal redemption is associated with the scheduling data, and in an instance in which the selected deal redemption is associated with the scheduling data, the scheduling server is configured to: (a) determine a first set of appointment times comprising available appointment times configured to be available to be scheduled as deal-redeeming appointments, (b) reduce the first set of appointment times to a second set of appointment times by removing at least one appointment time that if scheduled as a deal-redeeming appointment, would result in a percentage of deal-redeeming appointments within the given period exceeding the maximum percentage of deal-redeeming appointments allowed to be scheduled in the given period, based on the selected deal redemption, the merchant availability information and on the scheduling data, wherein the scheduling server is further configured to modify the scheduling database with the scheduling data, and wherein the scheduling server is further configured to transmit instructions to the consumer device for displaying the second set of available appointment times via the consumer interface, the second set of available appointment times comprising only available appointment times for which a deal may be redeemed and excluding appointment times that are available but for which a consumer is not permitted to redeem a deal based on the scheduling data and the maximum percentage of appointments, and wherein the merchant scheduling interface is further configured to receive second merchant inputs and to generate updated scheduling data based on the second merchant inputs, wherein the scheduling server is configured to process the data received via the network router such that the scheduling server receives the updated scheduling data from the merchant scheduling interface and the scheduling server is further configured to access the deal server comprising the deal database to determine whether the selected deal redemption is associated with the updated scheduling data, and in an instance in which the selected deal redemption is associated with the updated scheduling data the scheduling server is configured to reduce the second set of available appointment times to determine a third set of available appointment times based on the selected deal redemption, the maximum percentage of appointments within the given period, and on the updated scheduling data, wherein the scheduling server is further configured to modify the scheduling database with the updated scheduling data, and wherein the scheduling server is further configured to transmit instructions to the consumer device for displaying the third set of available appointment times via the consumer interface, wherein the voucher is applied to a selected appointment of the third set of available appointment times, enabling the discount to be applied at the selected appointment of the third set of the available appointment times, and wherein the scheduling server is further configured to analyze the scheduling data to identify an unscheduled service time at a merchant and access the deal database to generate a new deal offer based on at least the scheduling data, the generated new deal offer made available for sale in advance of the unscheduled service time and made available for redemption at the merchant during the unscheduled service time.

16. The computer program product of claim 15, wherein at least one of the first merchant inputs or second merchant inputs indicate merchant resource information, wherein the scheduling data is generated further based on the merchant resource information, and wherein the available appointment times reflect the merchant resource information.

17. The computer program product of claim 15, wherein the merchant resource information comprises information relating to tangible equipment required to perform appointments, and wherein the scheduling data is generated further based on the information relating to the tangible equipment.

18. The computer program product of claim 15, wherein the merchant resource information comprises a time duration required by a service provider to perform a specific type of appointment, and wherein the scheduling data is generated further based on the time duration.

19. The computer program product according to claim 15, wherein the second set of appointment times comprise only the available appointment times for which a deal may be redeemed to pay less than the full price, and excludes appointment times that are available at the full price, but for which a consumer is not permitted to redeem a deal.

* * * * *